United States Patent
Yuen et al.

(10) Patent No.: US 6,239,794 B1
(45) Date of Patent: *May 29, 2001

(54) METHOD AND SYSTEM FOR SIMULTANEOUSLY DISPLAYING A TELEVISION PROGRAM AND INFORMATION ABOUT THE PROGRAM

(75) Inventors: Henry C. Yuen, Redondo Beach; Daniel S. Kwoh, Flintridge; Roy J. Mankovitz, Encino; Elsie Leung, South Pasadena, all of CA (US)

(73) Assignee: E Guide, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/475,395

(22) Filed: Jun. 7, 1995

Related U.S. Application Data

(63) Continuation-in-part of application No. 08/424,863, filed on Apr. 17, 1995, now abandoned, which is a continuation-in-part of application No. 08/369,522, filed on Jan. 5, 1995, now abandoned, which is a continuation-in-part of application No. 08/312,863, filed on Sep. 27, 1994, now abandoned, which is a continuation-in-part of application No. 08/298,997, filed on Aug. 31, 1994, now abandoned.

(51) Int. Cl.⁷ .................................................. H04N 5/445
(52) U.S. Cl. ......................... 345/327; 348/565; 348/906
(58) Field of Search .................................. 348/565, 906, 348/12, 563, 564, 566, 567, 570, 731, 732; H04N 5/445, 5/45

(56) References Cited

U.S. PATENT DOCUMENTS

| | | | |
|---|---|---|---|
| 3,891,792 | 6/1975 | Kimura | 178/5.8 R |
| 4,691,351 | 9/1987 | Hayashi et al. | 380/10 |

(List continued on next page.)

FOREIGN PATENT DOCUMENTS

| | | |
|---|---|---|
| 447968 | 9/1991 | (EP) . |
| 488379 | 6/1992 | (EP) . |
| 497235 | 8/1992 | (EP) . |
| 444496 | 9/1996 | (EP) . |
| 2217144 | 10/1989 | (GB) . |
| 3-178278 | 8/1991 | (JP) . |
| 4-44475 | 2/1992 | (JP) . |
| WO 95/32583 | 11/1995 | (WO) . |
| WO 95/32585 | 11/1995 | (WO) . |
| WO 96/09721 | 3/1996 | (WO) . |
| WO 96/13935 | 5/1996 | (WO) . |
| WO 96/17473 | 6/1996 | (WO) . |

OTHER PUBLICATIONS

TV Guide On Screen information sheets.

RCA Satellite Receiver User's Manual.

(List continued on next page.)

*Primary Examiner*—Nathan Flynn
(74) *Attorney, Agent, or Firm*—Christie, Parker & Hale, LLP

(57) ABSTRACT

A television viewer uses a PIP format for display of program related information such as television program listings from a program schedule data base in the background and moving, real time or stored video clip images of a program selected from the displayed listings in the PIP window. All the text of the background information lies outside the PIP window. In one embodiment, as the viewer selects a particular program from the display of current television program listings by means of a cursor or a code number, the corresponding program automatically appears in the PIP window.

21 Claims, 33 Drawing Sheets

U.S. PATENT DOCUMENTS

| | | | |
|---|---|---|---|
| 4,694,490 | 9/1987 | Harvey et al. | 380/20 |
| 4,706,121 | 11/1987 | Young | 358/142 |
| 4,729,027 | 3/1988 | Hakamada et al. | 358/183 |
| 4,734,769 | 3/1988 | Davis | 358/142 |
| 4,746,983 | 5/1988 | Hakamada | 358/183 |
| 4,751,578 | 6/1988 | Reiter et al. | 358/183 |
| 4,821,102 | 4/1989 | Ichikawa et al. | 358/183 |
| 4,873,584 | 10/1989 | Hashimoto | 358/335 |
| 4,890,168 | 12/1989 | Inoue et al. | 358/335 |
| 4,908,707 | 3/1990 | Kinghorn | 358/147 |
| 4,918,531 | 4/1990 | Johnson | 358/183 |
| 4,954,882 | 9/1990 | Kamemoto | 358/22 |
| 4,991,011 | 2/1991 | Johnson et al. | 358/141 |
| 4,992,782 | 2/1991 | Sakamoto et al. | 340/747 |
| 4,998,171 | 3/1991 | Kim et al. | 358/183 |
| 5,027,400 * | 6/1991 | Baji. | |
| 5,038,211 | 8/1991 | Hallenbeck | 358/142 |
| 5,040,067 | 8/1991 | Yamazaki | 358/183 |
| 5,047,867 | 9/1991 | Strubbe et al. | 358/335 |
| 5,083,205 * | 1/1992 | Arai | 348/565 X |
| 5,109,279 | 4/1992 | Ando | 358/147 |
| 5,146,335 | 9/1992 | Kim et al. | 358/183 |
| 5,148,275 | 9/1992 | Blatter et al. | 358/147 |
| 5,161,019 | 11/1992 | Emanuel | 358/183 |
| 5,233,423 | 8/1993 | Jernigan et al. | 358/181 |
| 5,237,417 | 8/1993 | Hayashi et al. | 358/183 |
| 5,237,418 | 8/1993 | Kaneko | 358/183 |
| 5,247,364 | 9/1993 | Banker et al. | 358/191.1 |
| 5,253,066 | 10/1993 | Vogel | 358/188 |
| 5,285,265 | 2/1994 | Choi | 348/565 |
| 5,311,423 | 5/1994 | Clark | 364/401 |
| 5,315,392 | 5/1994 | Ishikawa et al. | 348/570 |
| 5,353,121 | 10/1994 | Young et al. | 348/563 |
| 5,390,027 | 2/1995 | Henmi et al. | 358/335 |
| 5,434,625 * | 7/1995 | Willis | 348/565 |
| 5,453,796 * | 9/1995 | Duffield. | |
| 5,477,262 | 12/1995 | Banker et al. | 348/7 |
| 5,479,268 * | 12/1995 | Young | 348/906 X |
| 5,485,221 | 1/1996 | Banker et al. | 348/563 |
| 5,523,796 * | 6/1996 | Marshall et al. | 348/589 |
| 5,528,304 * | 6/1996 | Cherrick et al. | 348/565 |
| 5,559,548 | 9/1996 | Davis et al. | 348/6 |
| 5,559,550 * | 9/1996 | Mankovitz et al. | 348/6 |
| 5,583,560 | 12/1996 | Florin et al. | 348/7 |
| 5,585,838 | 12/1996 | Lawler et al. | 348/13 |
| 5,600,364 | 2/1997 | Hendricks et al. | 348/1 |
| 5,610,664 * | 3/1997 | Bobert | 348/564 |
| 5,625,406 | 4/1997 | Newberry et al. | 348/7 |
| 5,635,978 | 6/1997 | Alten et al. | 348/7 |
| 5,731,844 | 3/1998 | Rauch et al. | 348/563 |

OTHER PUBLICATIONS

Panasonic TX–33A1G Operating Instructions.

Prevue Networks, Inc. promotional materials.

VideoGuide User's Manual.

StarSight Operating Guide and Quick Reference.

SuperGuide On Screen Satellite Program Guide, User's Guide, Owner's Manual, and sales literature.

Rundfunktechnische Mitteilungen, vol. 30, No. 1 Jan. 1986–Feb. 1986 Norderstedt (DE).

Symposium Record Cable Sessions, "Digital On–Screen Display A New Technology for the Consumer Interface", Publication date May 1993.

James Sorce, Designing a Broadband Residential Entertainment Service: A Case Study, 13th International Symposium Human Factors in Telecommunications, Torino,Italy, Sep. 10–14, 1990.*

* cited by examiner

FIG.22    RAM MEMORY DATA BASE

FIG.24
MEMORY BIT MAP

|   | 7 | 6 | 5 | 4 | 3 | 2 | 1 | 0 |
|---|---|---|---|---|---|---|---|---|
| 0 | 1 | 1 | 1 | 1 | 0 | 1 | 1 | 1 |
| 1 | 1 | 0 | 0 | 1 | 1 | 1 | 0 | 1 |
| 2 | 1 | 1 | 1 | 1 | 1 | 1 | 1 | 1 |
| 3 | 0 | 0 | 0 | 0 | 0 | 0 | 0 | 0 |
| 4 | 1 | 1 | 1 | 1 | 1 | 1 | 0 | 0 |
| 5 | 1 | 1 | 1 | 1 | 0 | 0 | 1 | 1 |
| 6 | 1 | 0 | 1 | 1 | 1 | 1 | 1 | 1 |
| 7 | 1 | 1 | 0 | 0 | 0 | 0 | 0 | 1 |
| 8 | 1 | 0 | 0 | 1 | 1 | 1 | 1 | 0 |
| 9 | 0 | 1 | 1 | 1 | 1 | 1 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 1 | 1 | 1 | 1 | 1 | 1 | 0 | 1 |
| 14 | 1 | 1 | 1 | 1 | 1 | 1 | 1 | 1 |
| 15 | 1 | 1 | 1 | 0 | 1 | 0 | 0 | 0 |
| 16 | 0 | 0 | 0 | 0 | 0 | 0 | 0 | 0 |
| 17 | 0 | 0 | 0 | 0 | 1 | 1 | 0 | 1 |

— 310
— 311
— 312

FIG.25
PRE-ESTABLISHED TIME LIST

| | 00-04 | 04-08 | 08-12 | 12-16 | 16-20 | 20-24 |
|---|---|---|---|---|---|---|
| 0 | $A_1$ | $B_1$ | $C_1$ | $D_1$ | $E_1$ | $F_1$ |
| 1 | $G_1$ | $H_1$ | $I_1$ | $J_1$ | $K_1$ | $L_1$ |
| 2 | $A_2$ | $B_2$ | $C_2$ | $D_2$ | $E_2$ | $F_2$ |
| 3 | $G_2$ | $H_2$ | $I_2$ | $J_2$ | $K_2$ | $L_2$ |
| 4 | $A_3$ | $B_3$ | $C_3$ | $D_3$ | $E_3$ | $F_3$ |
| 5 | $G_3$ | $H_3$ | $I_3$ | $J_3$ | $K_3$ | $L_3$ |
| ⋮ | | | | | | |
| $Z_N$ | $A_N$ | $B_N$ | $C_N$ | $D_N$ | $E_N$ | $F_N$ |
| $Z_{N+1}$ | $G_N$ | $H_N$ | $I_N$ | $J_N$ | $K_N$ | $L_N$ |

N = THE MAXIMUM NUMBER OF CHANNELS

FIG.26
SHOW INFORMATION PACKAGE

| AMOUNT OF MEMORY USED |
|---|
| CONTROL DATE |
| VERSION NUMBER |
| MULTIPLE SHOW FLAG \| START TIME |
| DURATION |
| THEME |
| CC \| STEREO \| ADD ONS |
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW=NULL |
| MULTIPLE SHOW FLAG \| START TIME |
| DURATION |
| THEME |
| CC \| STEREO \| ADD ONS |
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW=NULL |
| ⋮ |
| MULTIPLE SHOW FLAG \| START TIME |
| DURATION |
| THEME |
| CC \| STEREO \| ADD ONS |
| TITLE LENGTH |
| TITLE |
| PRIMARY DESCRIPTION LENGTH |
| PRIMARY DESCRIPTION |
| SECONDARY DESCRIPTION LENGTH |
| SECONDARY DESCRIPTION |
| VCR PLUSCODE LENGTH |
| VCR PLUSCODE |
| END OF SHOW=NULL |

FIG.27

SHOW INFORMATION PACKAGE FEATURES

| SECONDARY DESCRIPTION LENGTH=MAX |
| --- |
| SECONDARY DESCRIPTION LENGTH |
| SECONDARY DESCRIPTION |
| VCR PLUSCODE LENGTH |
| VCR PLUSCODE |
| EXTRA DATA LENGTH |
| EXTRA DATA |
| END OF SHOW=NULL |
| |

FIG.30 CONTROL ARRAY

| Index | Display | Add Ons |
|---|---|---|
| 0 | DISPLAY | ADD ONS |
| 1 | DISPLAY | ADD ONS |
| 2 | DO NOT DISPLAY | ADD ONS |
| 3 | DISPLAY | ADD ONS |
| 4 | DISPLAY | ADD ONS |
| ... | ... | ... |
| N | DISPLAY | ADD ONS |

320 →

N = MAX NUMBER OF CHANNELS

FIG.29 CHANNEL MAP

| Index | Channel |
|---|---|
| 0 | 7 |
| 1 | 6 |
| 2 | 11 |
| 3 | 2 |
| 4 | 4 |
| ... | ... |
| N | 172 |

N = MAX NUMBER OF CHANNELS

FIG. 32
RECORD QUEUE

| | CHANNEL | START TIME |
|---|---|---|
| 1 | CHANNEL | START TIME |
| 2 | CHANNEL | START TIME |
| 3 | CHANNEL | START TIME |
| | ... | |
| 20 | CHANNEL | START TIME |

FIG. 31
CALL LETTER MAP

| 0 | K |
|---|---|
| 1 | A |
| 2 | B |
| 3 | C |
| 4 | W |
| 5 | W |
| 6 | O |
| 7 | R |
| ... | ... |
| 4N | K |
| 4N+1 | T |
| 4N+2 | V |
| 4N+3 | R |

METHOD AND SYSTEM FOR SIMULTANEOUSLY DISPLAYING A TELEVISION PROGRAM AND INFORMATION ABOUT THE PROGRAM

CROSS-REFERENCE TO RELATED APPLICATIONS

This application is a continuation-in-part of application Ser. No. 08/424,863, filed Apr. 17, 1995, now abandoned, which is a continuation-in-part of application Ser. No. 08/369,522, filed Jan. 5, 1995, now abandoned, which is a continuation-in-part of application Ser. No. 08/312,863, filed Sep. 27, 1994, now abandoned, which is a continuation-in-part of application Ser. No. 08/298,997, filed Aug. 31, 1994 now abandoned. The disclosures of these applications are incorporated fully herein by reference.

FIELD OF THE INVENTION

This invention relates to the field of television and, more particularly, to a method and system for simultaneously displaying video programs and related text on a television screen.

BACKGROUND OF THE INVENTION

For a number of years television receivers have been equipped with picture-in-picture (PIP) capability. In PIP format, the moving, real time images of one television channel are displayed on the background of the screen and the moving, real time images of another television channel are displayed in a PIP window overlaid on a small area of the background. Because two channels are simultaneously displayed by the television receiver, two tuners are required. The viewer enters the PIP mode by pressing a PIP key of his or her controller. Then, the viewer can change either the channel of the background or the channel of the PIP by resetting the appropriate tuner. To reverse the background and PIP images, the viewer simply presses a SWAP key. To collapse the PIP window, the viewer again presses the PIP key.

Television program guides help television viewers select programs to watch. Such television program guides list the available television programs by day of the week, time of day, channel, and program title. For many years television program guides have been published in hard copy form. More recently as illustrated by Levine Patent 4,908,713, television program guides have begun to take an electronic form. In other words, the schedule of program listings is stored in an electronic memory connected to the television receiver. The program listings are recalled from memory by the viewer on command for display on the television screen.

Despite the prevalence of television program guides, many viewers still make their program selections by switching the television tuner from channel to channel and observing on the screen what program is being received on the respective channels. This process is sometimes called "grazing."

Emanuel Patent 5,161,019 discloses an automated form of channel grazing. A preselected group of channels are sequentially scanned by switching the tuner of the television receiver from channel to channel. A still image of the program received on each channel is stored in a memory. After all the channels have been scanned, the still images from all the channels are simultaneously displayed on the television screen. This process gives the viewer more information about the program choices in addition to that obtainable from a television program guide, namely, the displayed still images of the actual programs.

SUMMARY OF THE INVENTION

According to the invention, the moving images of a television program are displayed in a PIP window on the screen of a television monitor and textual information related to the television program is displayed in the background on the screen. Preferably, the audio portion of the television program displayed in the PIP window is also reproduced by the sound system of the television monitor. The textual information is arranged on the screen so none of it is covered by the moving images.

In one embodiment, the textual program related information (PRI) is a television program schedule. One of the program listings of the schedule identifies by title and time and/or channel the television program in the PIP window, which comprises moving images.

To facilitate channel grazing, a television viewer can use a PIP format for display of current television program listings from a program schedule data base in the background and moving, real time images of a program selected from the displayed listings in the PIP window. Specifically, as the viewer selects a particular program from the displayed current television program listings by means of a cursor or a code number, the corresponding program automatically appears in the PIP window. In this way, the viewer can channel graze by sequentially selecting the individual program listings in the background. When the viewer finds a program that the viewer wishes to watch, the viewer leaves the PIP format and returns to full screen television viewing, the tuner already being set to the desired program. To do this the viewer can reverse the background and PIP window and then collapse the window, leaving the desired program on the full screen or apparatus can be configured to return to full screen viewing in a single step.

To permit the viewing of programs scheduled for future broadcast without losing sight of the current program being watched, a television viewer can use a PIP format for display of television program listings for a specific channel from a program schedule data base in the background and moving, real time images of the current program on that channel in the PIP window. Specifically, as the viewer changes channels, the current program on that channel automatically appears in the PIP window. The viewer can control the background to display program listings for a period of days, e.g. a week, in the future. In this way, the viewer can continue to watch a television program while ascertaining the future programs on the channel to which the television tuner is set. When the viewer finds a program that the viewer wishes to watch, the background disappears, leaving the program on the channel to which the tuner is set on the full screen.

In another embodiment, a television viewer can use a PIP format for display of future television program listings from a program schedule data base in the background and moving images of a video clip of one of the program listings in the background display selected for example by a cursor.

In yet another embodiment, the textual program related information (PRI) is a message that is broadcast in the vertical blanking interval of the television signal contemporaneously with the television program displayed in the PIP window.

BRIEF DESCRIPTION OF THE DRAWINGS

The features of specific embodiments of the best mode contemplated of carrying out the invention are illustrated in the drawings, in which:

FIG. 24 is a representation of the memory bit map contained in the RAM memory;

FIG. 25 is a representation of the pre-established time list data structure contained in the static area of the RAM memory;

FIG. 26 is an illustration of a show information package data structure;

FIG. 27 is an illustration of a section of a show information package data structure;

FIG. 29 is a representation of the channel map data structure contained in the static area of the RAM memory;

FIG. 30 is a representation of the control array data structure contained in the static area of the memory;

FIG. 31 is a representation of the call letter map data structure located in the static area of the RAM memory;

FIG. 32 is a representation of the record queue data structure located in the static area of the RAM memory.

DETAILED DESCRIPTION OF A SPECIFIC EMBODIMENT

Figure 1:
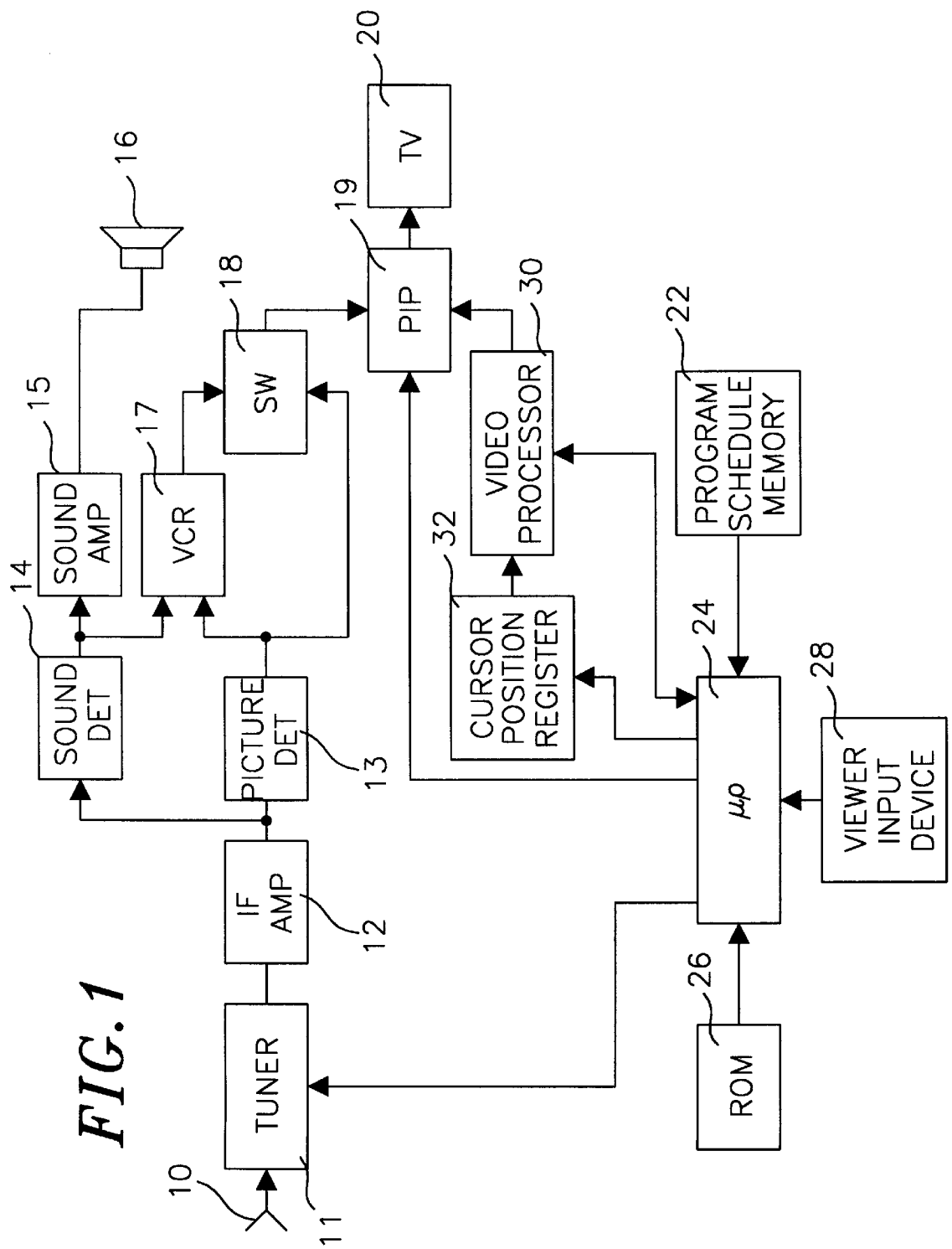
FIG. 1 is a schematic block diagram of a television receiver that has an electronic television program guide incorporating the principles of one embodiment of the invention.

In the following description of the embodiments of the invention, common reference numerals are used to represent the same components. If the features of all the embodiments are incorporated into a single system, these components can be shared and perform all the functions of the described embodiments.

In a preferred embodiment, the invention displays information about television program schedules and content in a tripartite electronic television program guide. One screen format is a time specific program guide (TISPG); another screen format is a channel specific program guide (CSPG); and the third screen format is a theme specific program guide (THSPG). In each case, the moving images of a currently broadcast television program are displayed in real time in a PIP window.

With reference to FIG. 1, a source of television signals 10 such as a terrestrial antenna, or a cable is connected to a television tuner 11. The term "telecast" refers to a terrestrial, satellite, or cable transmission. The output of tuner 11 is a modulated intermediate frequency signal containing video and audio television information. Tuner 11 is connected by an intermediate frequency amplifier (IF AMP) 12 to a picture detector (PICTURE DET) 13 and a sound detector (SOUND DET) 14, which produce base band video and audio signals, respectively. The audio signal is coupled by a sound amplifier (SOUND AMP) 15 to a loudspeaker 16. The video signal is coupled by a video amplifier not shown to one input of a switch 18. Sound detector 14 and picture detector 13 are connected to the audio and video inputs, respectively, of a video cassette recorder (VCR) 17. (Alternatively, television signal source 10 could be directly connected to the RF input of VCR 17, if its internal tuner and demodulating circuitry is to be utilized.) The output of VCR 17 is connected to the other input of switch 18. The output of switch 18 is connected to one input of a conventional picture-in-picture (PIP) integrated circuit chip 19. The output of PIP chip 19 is connected to the video input of a television receiver or monitor (TV) 20 having a screen (not shown).

An updatable data base of the schedule of program listings of all the available channels for a prescribed period of time, e.g. a day or a week, is electronically stored in a program schedule memory 22. These program listings typically include for each program the title, a program description, the day of the week, the start time of the day, the program length, and the channel on which the program is transmitted and thus available for reception at source 10. In a preferred embodiment of the invention, the period of time for which the program listings are stored is different for the guides, depending upon viewer priorities and preferences. For example, the information needed to display the TISPG and CSPG may be stored for one or two days and the information needed to display the TSPG may be stored for a week or more. The data base can be updated by a continuous data link in the vertical blanking interval (VBI) of one television channel broadcast to the television receiver in well known fashion. Alternatively, the data base can be updated by unplugging memory 22 and replacing it with a memory having the updated data base. Memory 22 is connected to a microprocessor 24 that is programmed to control the operation of the described equipment. An operating program for microprocessor 24 is stored in a read only memory (ROM) 26. A viewer input device 28, preferably in the form of a remote IR controller, is coupled to microprocessor 24 to provide commands from the viewer. A video processor 30 is coupled to microprocessor 24. When the viewer wishes to see television program listings, microprocessor 24 recalls a portion of the program schedule data base from memory 22 and couples it to video processor 30, where the program listings are formatted for display. Preferably, the information stored in video processor 30 is a bit map of what is displayed on the screen of television receiver 20. Video processor 30 is connected to the other input of PIP chip 19. Preferably, viewer input device 28 controls microprocessor 24 by cursor movement on the screen of television receiver 20. To this end, microprocessor 24 and video processor 30 are coupled to a cursor position register 32. (Alternatively, the viewer can select items of information displayed on the screen by keying into viewer input device 28 code numbers assigned to these items.) Microprocessor 24 is also coupled to tuner 11 for channel change, to VCR 17 for play/record selection and start/stop, to switch 18 for selection of one of its inputs, and to PIP chip 19 for selection of the mode of PIP operation.

The formats of the electronic program guide are shown in FIGS. 2 to 5. Each format has a background area 40 and an overlaid PIP window 42 in the upper left-hand corner of the screen. The real time, i.e., 6:15 p.m., is displayed in a sub-area 42a PIP window 42. Background area 40 includes a banner and message prompting area 43 at the top of the screen, a program description area 44 in the upper right-hand corner of the screen adjacent to PIP window 42, and a program schedule area 46 below areas 42 and 44. Program description area 44 includes the start time and length (duration) of the program being described. The viewer can move a cursor 48 vertically to highlight one of the program listings displayed in area 46. The highlighted background of cursor 48 and the background of program description area 44 are the same color or shade. In each format, the complete, moving images of a currently broadcast television program in real time and the current time are displayed in PIP window 42 and the audio portion of the television program displayed in PIP window 42 is reproduced by the sound system of monitor 20. The information displayed in areas 43, 44, and 46 varies depending upon the format.

Figure 2:
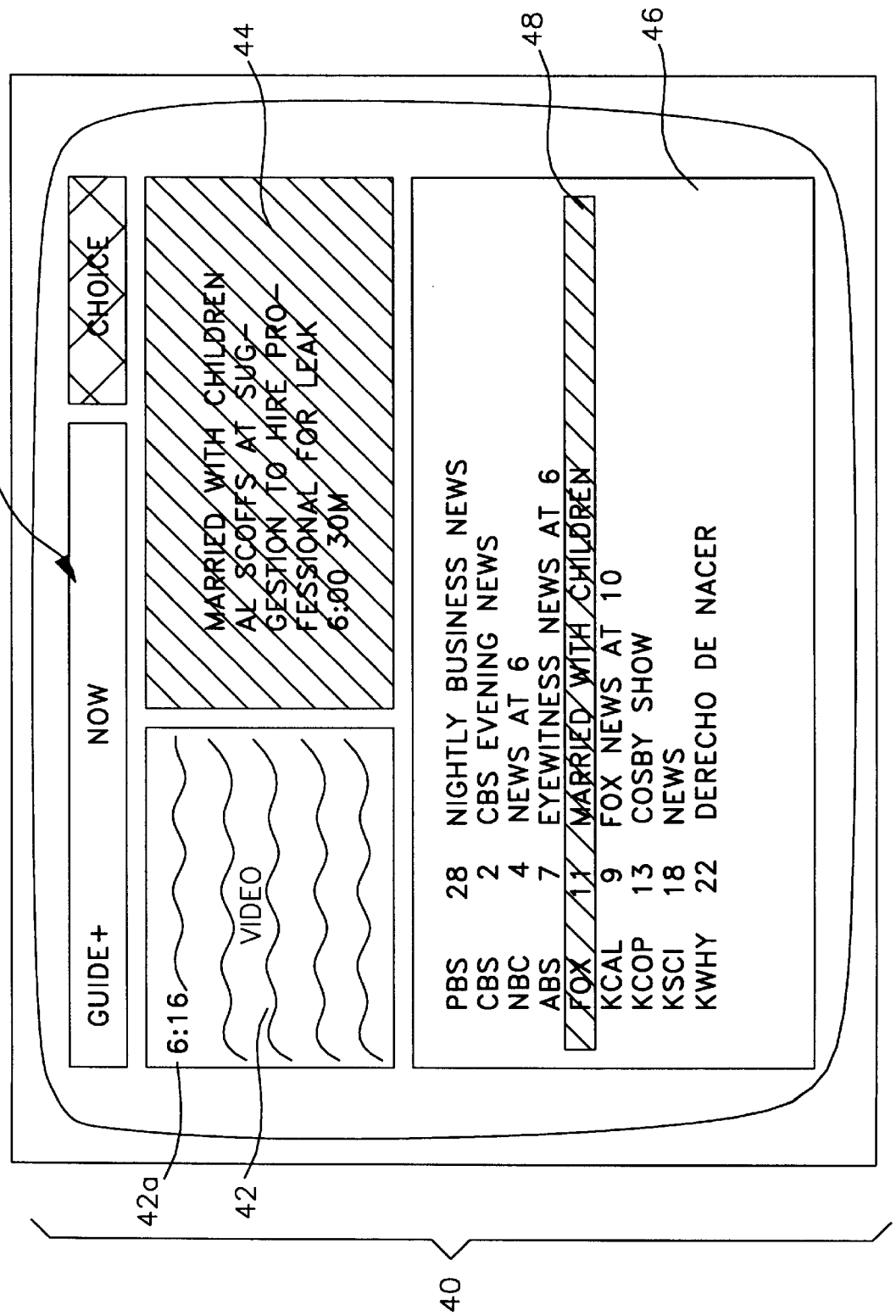
FIGS. 2 to 5 are television screens formatted in accordance with the embodiment of FIG. 1.

One version of the TISPG screen format is shown in FIG. 2, namely a version that displays program listings of television programs being broadcast at the current time. In the following description, this format is sometimes called the "NOW" guide or the "ALL CHANNEL" guide. Program schedule area 46 has a column for channel name or call letters, a column for channel number, and a column for program title; each line of area 46 represents a separate program listing. The moving, real time images of the current television program highlighted by cursor 48 are displayed in PIP window 42 and a brief program description of the highlighted program is displayed in area 44.

Figure 3:
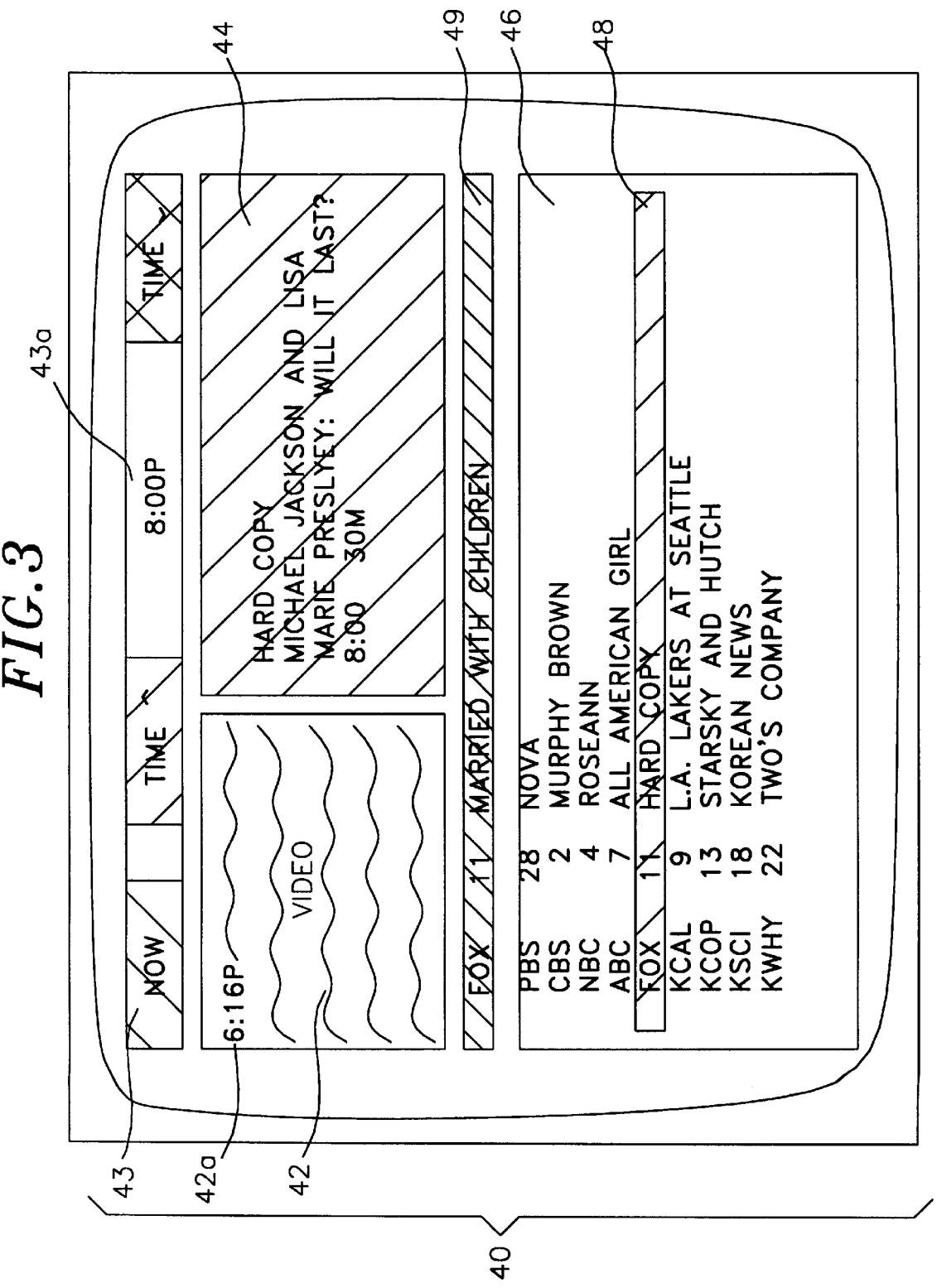

In FIG. 3 another version of the TISPG screen format displays in area 46 program listings being broadcast at a future time, i.e., 8:00 p.m. In the following description, this format is sometimes called the "NEXT" guide. The viewer can select the future time of the program listings to be displayed at intervals such as one-half hour. The selected future time, i.e., 8:00 p.m., for the program listings displayed in area 46 is shown in a sub-area 43a of area 43. A brief program description of the program listing highlighted in area 46 by cursor 48 is displayed in area 44. The current program being broadcast remains displayed in PIP window 42, and a banner 49 which identifies the current program by channel name, channel number, and program title is displayed between PIP window 42 and area 46 on a background having a different color or shade than cursor 48.

Figure 4:
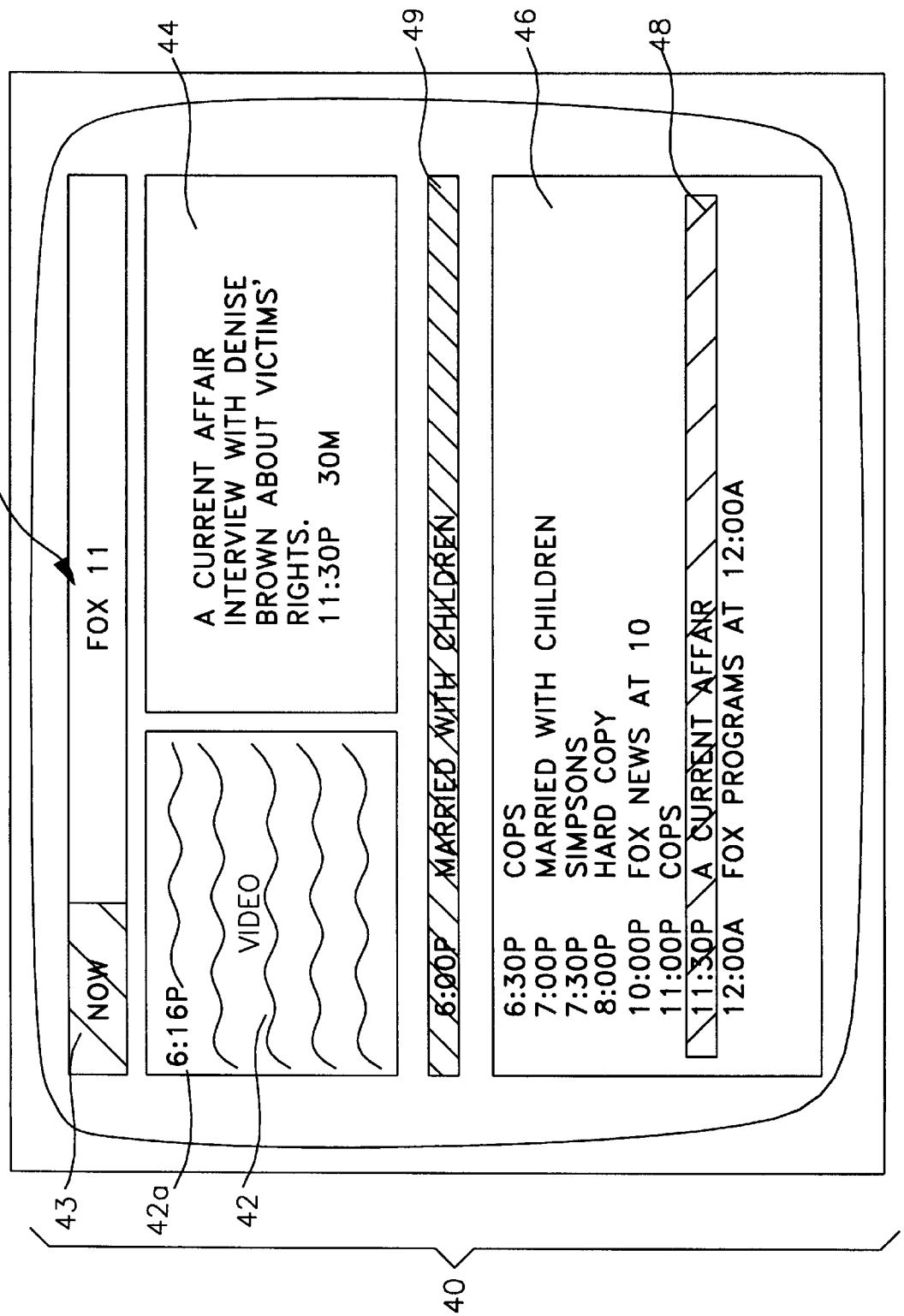

In FIG. 4, the CSPG screen format is shown. In the following description, this format is sometimes called the "THIS CHANNEL" guide. All the program listings for a selected channel, i.e., FOX Channel 7, are displayed in area 46, from the currently broadcast program into the future for a specified time period, e.g., 24 hours or until the end of the next day. Area 46 has a column for time and a column for program title; each line of area 46 represents a separate program listing. The moving, real time images of the current television program are displayed in PIP window 42. If the cursor also highlights the current program, a brief program description of the current program is displayed in area 44. If the cursor highlights another program listing, as shown in FIG. 4, a brief program description of the highlighted program is displayed in area 44 and the current program is identified in banner 49 by time and title.

Figure 5:
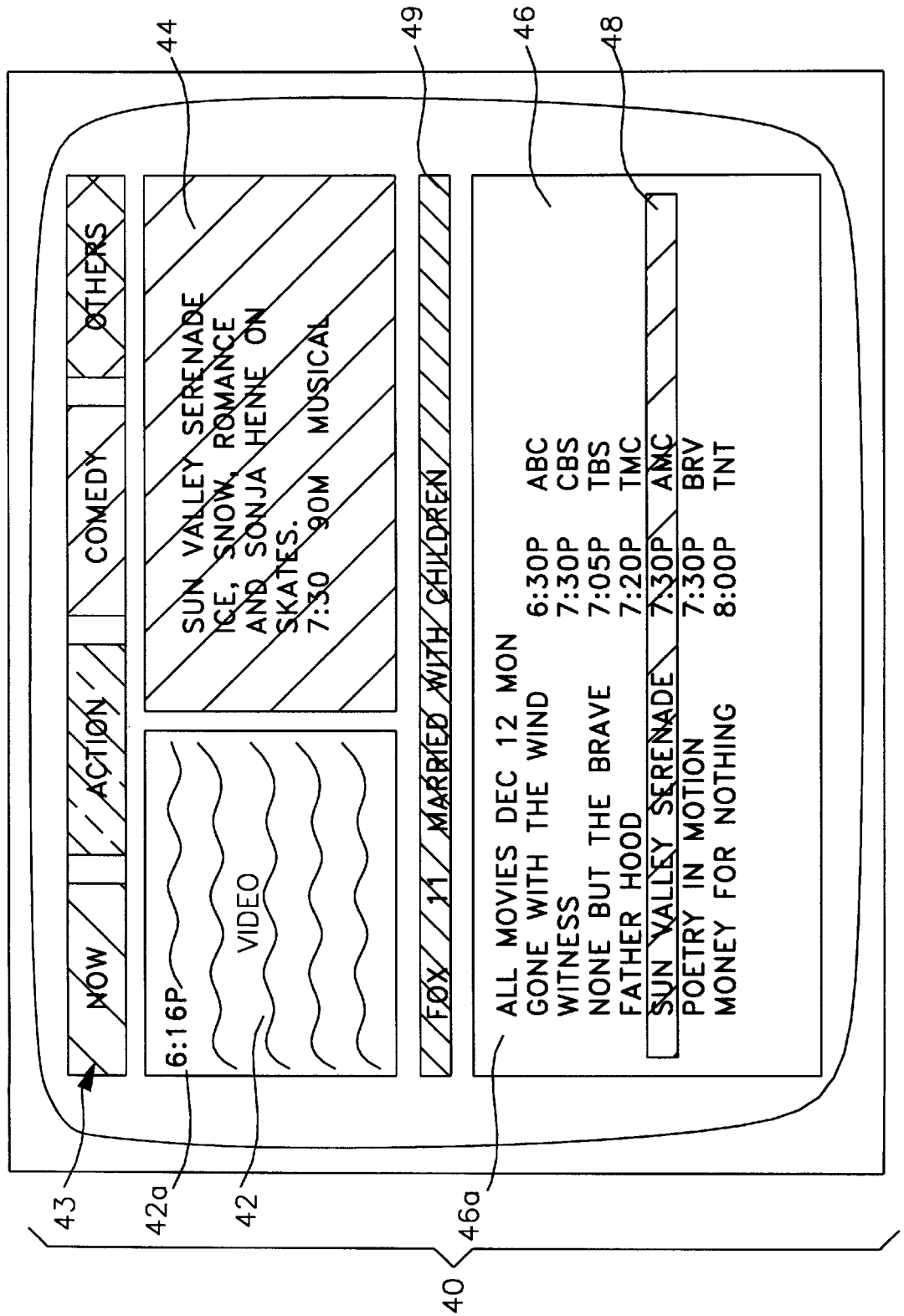

In FIG. 5, the THSPG screen format is shown. In the following description, this format is sometimes called the "SORT" guide. The program listings for a selected theme or subtheme, i.e., ALL MOVIES, are displayed in area 46, from the next broadcast program into the future for a specified time period, e.g., one week. Area 46 has a heading 46a that identifies the theme or subtheme, date, and day, i.e., ALL MOVIES DEC 12 MON, a column for title, a column for start time, and a column for channel name or number; each line of area 46 represents a separate program listing. The moving, real time images of the current television program are displayed in PIP window 42 and the current program is identified in banner 49 by channel name or number and title. A brief program description of the program highlighted by cursor 48 is displayed in area 44.

All four areas of background 40 are formatted in video processor 30. The memory space of video processor 30 corresponding to the area in which PIP window 42 appears on the screen is left blank; i.e., although overlaid on background area 40, PIP window 42 does not cover up any of the information of background area 40. By means of a pair of up/down arrows on viewer input device 28, the viewer can move a cursor 48 vertically to highlight the listing of one of the currently playing television programs displayed in area 46. Preferably, to reduce delays in displaying the program schedules, all the program listings for the particular screen format are stored in video processor 30, even though only a fraction of them are displayed at the same time. When the cursor reaches the top or bottom listing in area 46, microprocessor 24 recalls further program listings from video processor 30 for display on the screen of television receiver 20.

In all the formats, the moving, real time images of the current television program highlighted by cursor 48 are displayed in PIP window 42, the program description of the highlighted program is displayed in area 44, program listings of one type or another are displayed in area 46, and one or more prompts are displayed in banner area 43 as described in more detail below. The audio portion of the television program displayed in PIP window 42 is reproduced by the sound system of monitor 20. The PIP display, the sound reproduction, and the program description in area 44 enable the viewer to assess better whether or not to watch the highlighted program. As the viewer moves cursor 48 vertically from program listing to program listing, the current television program displayed in window 42 and the program description displayed in area 44 automatically change accordingly to match the highlighted program in area 46. As the cursor moves from one program listing to another, tuner 11 is set to the channel for the highlighted program listing so the program can be displayed in PIP window 42, microprocessor 24 recalls the program description for the highlighted listing from program schedule memory 22, and video processor 30 formats this program description so it can be displayed in area 44.

Preferably, two levels of detail are available for the program description. Normally, the first level detail of the program description is displayed in area 44 as described above. When more detail is desired, the viewer operates input device 28 to display a second level detail of the program description. There are two options for the display of the second level detail. As one option, the second level detail can replace the first level detail in area 44. This has the advantage that the program listings can continue to be seen by the viewer while more detail about the program description is displayed. As the other option, the second level detail can replace the program listings in area 46. This has the advantage that more space is available to display the second level of detail than the first level.

Figure 6:
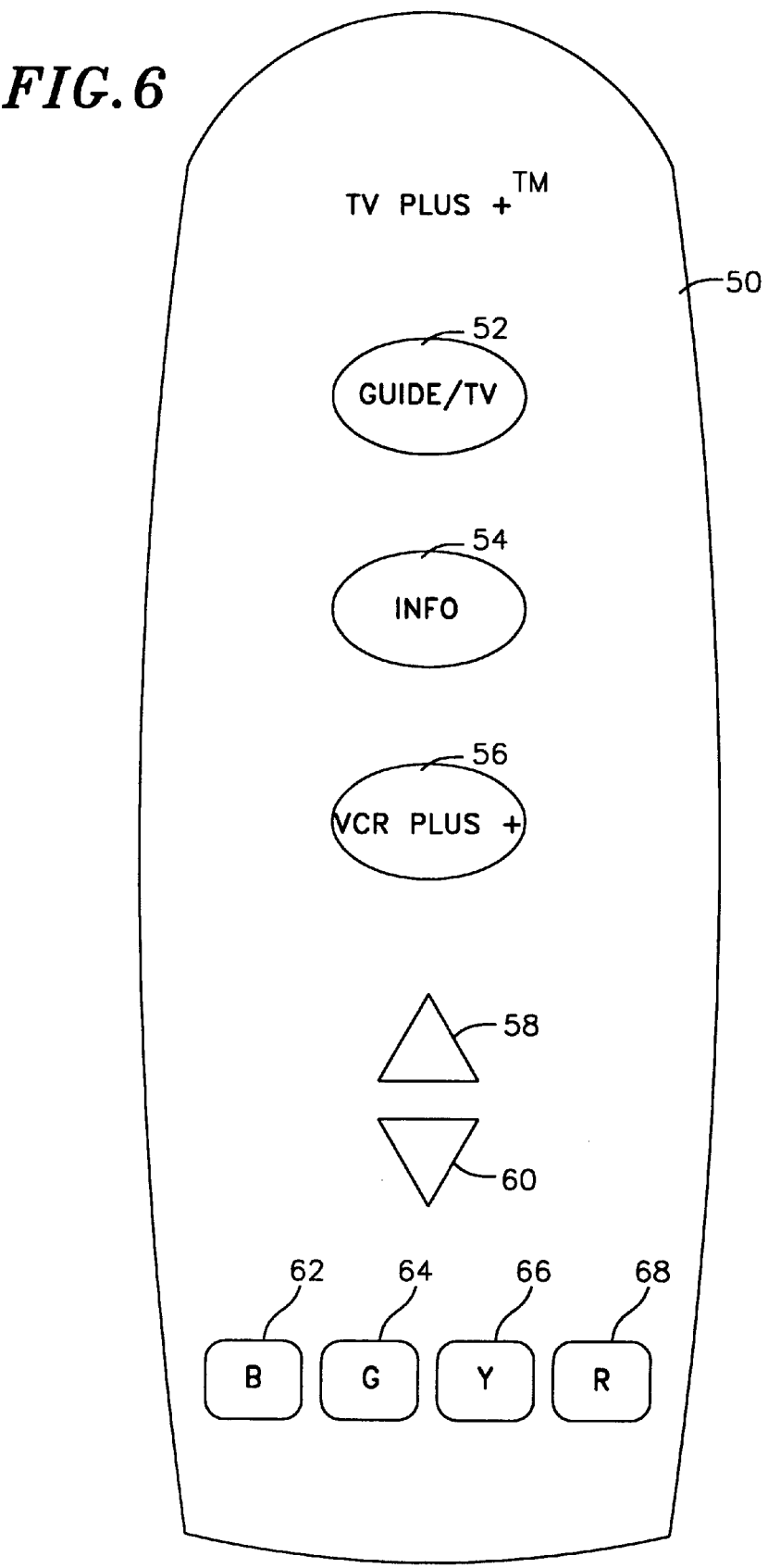
FIG. 6 is a top plan view of a remote controller for operating the electronic program guide of FIG. 1.

Reference is made to FIGS. 6 to 14 for a description of the steps taken by a viewer to navigate about the preferred embodiment of the television program guide. Viewer input device 28 preferably takes the form of a hand-held remote infrared (IR) transmitter which communicates with an infrared receiver connected to microprocessor 24. As shown in FIG. 6, the IR transmitter has a housing 50 on which a number of control buttons are mounted. A GUIDE/TV button 52, an INFO button 54, and a VCR PLUS+ button 56 are located above up and down arrow buttons 58 and 60. A row of buttons 62, 64, 66 and 68 which marked with the colors blue (B), green (G), yellow (Y), and red (R), respectively, underlie down arrow button 60. Red, green, yellow, and blue prompts are displayed in area 43 of the electronic guides. To select a prompt on the screen, the button of the IR transmitter having the corresponding color is pressed, i.e., to select the blue prompt on the screen, blue button 62 is pressed.

The screen formats and the links between the individual guides are designed with two objectives in mind—first, always to display the program the viewer was watching before entering the electronic guide and second, never to leave the electronic guide while navigating through it, until the viewer returns to the TV mode. As described below, the guides are linked to each other in a one way hierarchy that is accessed by on screen prompts color coded to the buttons on the remote control transmitter. At each level of the hierarchy, the viewer has the choice of returning to a backbone guide, or moving down to a guide at a lower level in the hierarchy. At the lowest level, the only choice is to return to the backbone guide. At each level, the viewer's choices are displayed on the screen by the prompts, so the need to use the buttons on viewer input device 28 to navigate through the guide is minimized.

Figure 7:
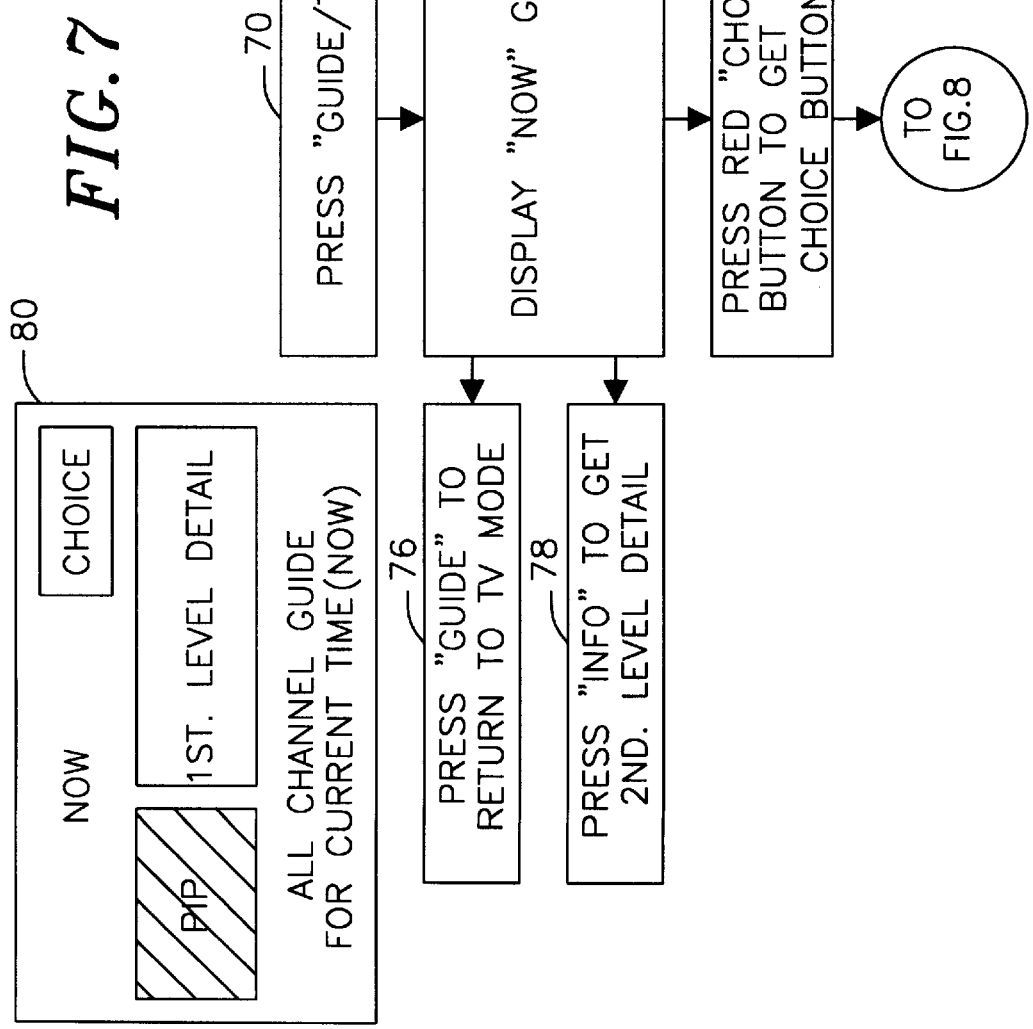
FIGS. 7 to 14 are flow diagrams showing how a viewer navigates through the electronic program guide of FIG. 1 and the screen formats encountered by the viewer during such navigation.

As represented in FIG. 7 by a box 70, the viewer enters the electronic guide by pressing GUIDE/TV button 52 on the remote transmitter. As represented by a box 72, the so-called "NOW" guide is then displayed on the screen. This is the "backbone" of the electronic guide in that it is the starting point for entry into each other guide.

As represented by a box 74 in each of FIGS. 8 to 14, the viewer may cursor up and down the program listings in area 46 to select a particular program. As represented by a box 76 in each of FIGS. 8 to 14, the viewer presses GUIDE/TV button 52 to return to the full screen TV mode and presses INFO button 54 to display the second level detail of the program information in area 44 or area 46.

In FIG. 7 a box 80 depicts the layout of the NOW guide, which is a version of the TISPG screen format. Area 43 has a red "CHOICE" prompt and a banner that identifies the format as the "NOW" format and displays the date, day, and time. When the viewer presses red button 68 on the remote transmitter (FIG. 6), as represented by a block 82, four prompting choices are presented to the viewer. As represented by a block 84 in FIG. 8, these prompting choices are displayed in an "ALL CHANNEL" guide.

Block 86 represents the "ALL CHANNEL" guide, which is identical to the "NOW" guide except for area 43. This is a transition guide in that it permits the viewer to enter other guides at a lower level of the hierarchy by following the displayed prompts. In the "ALL CHANNEL" guide, a blue NOW prompt, a green CSPG prompt, a yellow NEXT prompt, and a red SORT prompt are displayed. As represented by a box 88, in each of the guides of FIGS. 8 to 14, a return to the NOW guide of FIG. 7 occurs when the viewer presses blue button 62 on the remote control transmitter.

Figure 8:
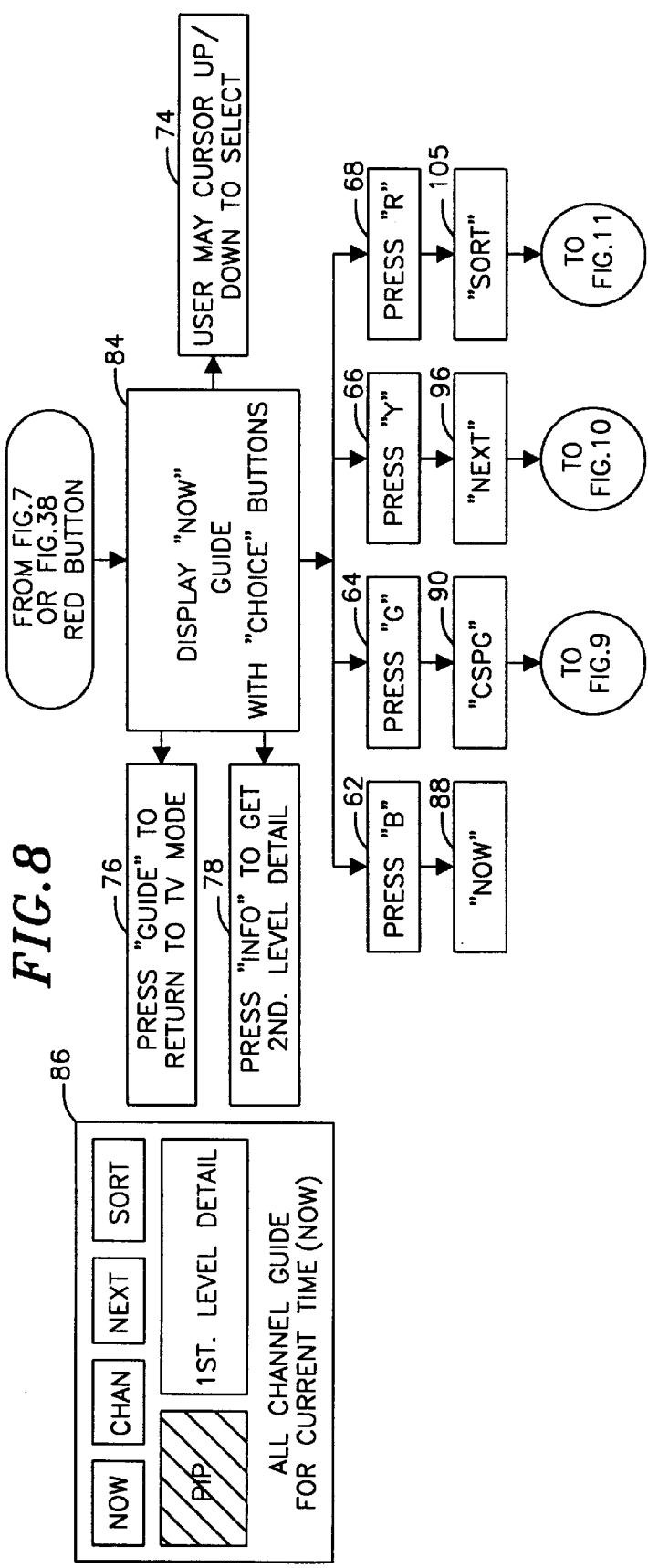
Figure 9:
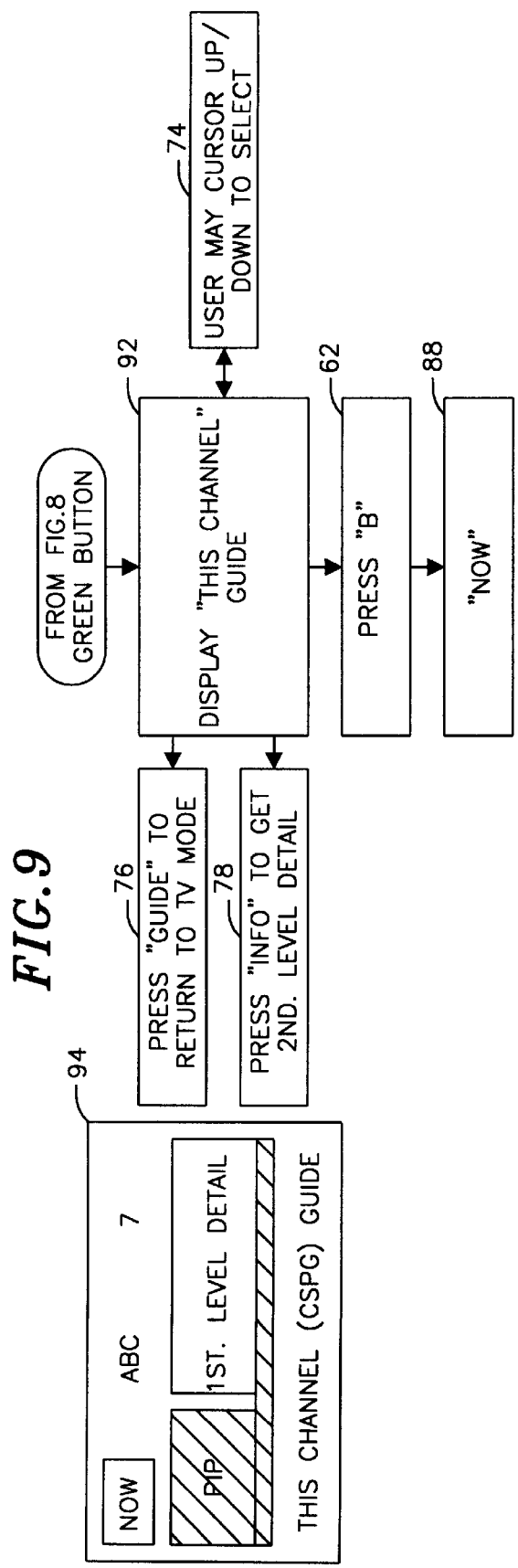

As represented by a box 90 in FIG. 8 and a box 92 in FIG. 9, when green button 64 is pressed from the ALL CHANNEL guide, a "THIS CHANNEL" guide in the CSPG format described above is displayed. A box 94 depicts the THIS CHANNEL guide, which is at the bottom of the hierarchy. So, only one prompt is displayed in area 43, namely the blue NOW prompt, which permits the viewer to return to the NOW guide. Area 43 also displays the name and channel number of the specific channel, e.g. ABC, Channel 7.

Figure 10:
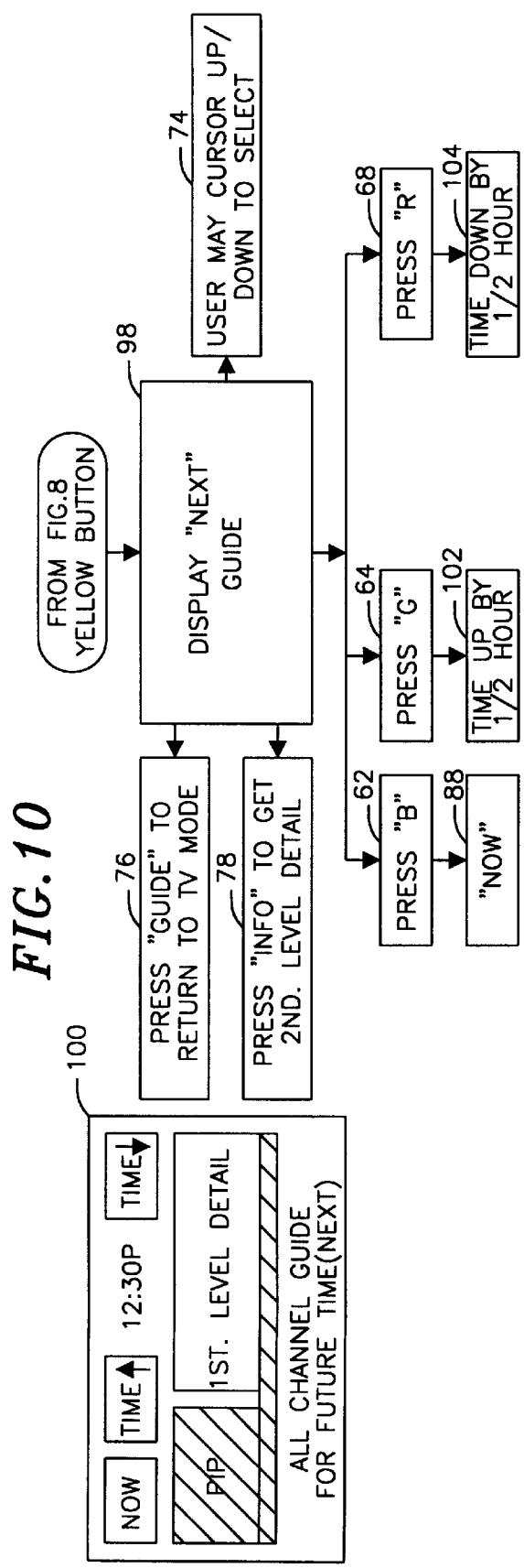

As represented by a box 96 in FIG. 8 and a box 98 in FIG. 10, to display the "NEXT" guide, the viewer presses yellow button 66 on the remote control transmitter. The NEXT guide, which has the TISPG format, is depicted by a box 100. Initially, current programs are displayed in area 46, as in the NOW guide (FIG. 2). Area 43 in the NEXT guide has in addition to the blue NOW prompt, a green up arrow prompt, a red down arrow prompt, and the time of the programs displayed in guide between the up and down arrows. Area 43 also displays the time at which the listed programs are broadcast, i.e., initially the current time. Each time the viewer presses red button 68, the guide advances one half hour so the programs broadcast at a one-half hour later time are displayed, as represented by a box 104, and the time displayed in area 43 changes accordingly. Each time the viewer presses green button 64, the guide retreats one half hour so the programs broadcast at a one-half hour earlier time are displayed, as represented by a box 102 and the time displayed in area 43 changes accordingly. When buttons 64 and 66 are pressed to display future programs in area 46, banner 49 (FIG. 3) appears to identify the current real time television program being displayed in PIP window 42. The NEXT guide is at the bottom of the hierarchy so the only route of exit from this guide is the BLUE prompt to return to the NOW guide.

Figure 11:
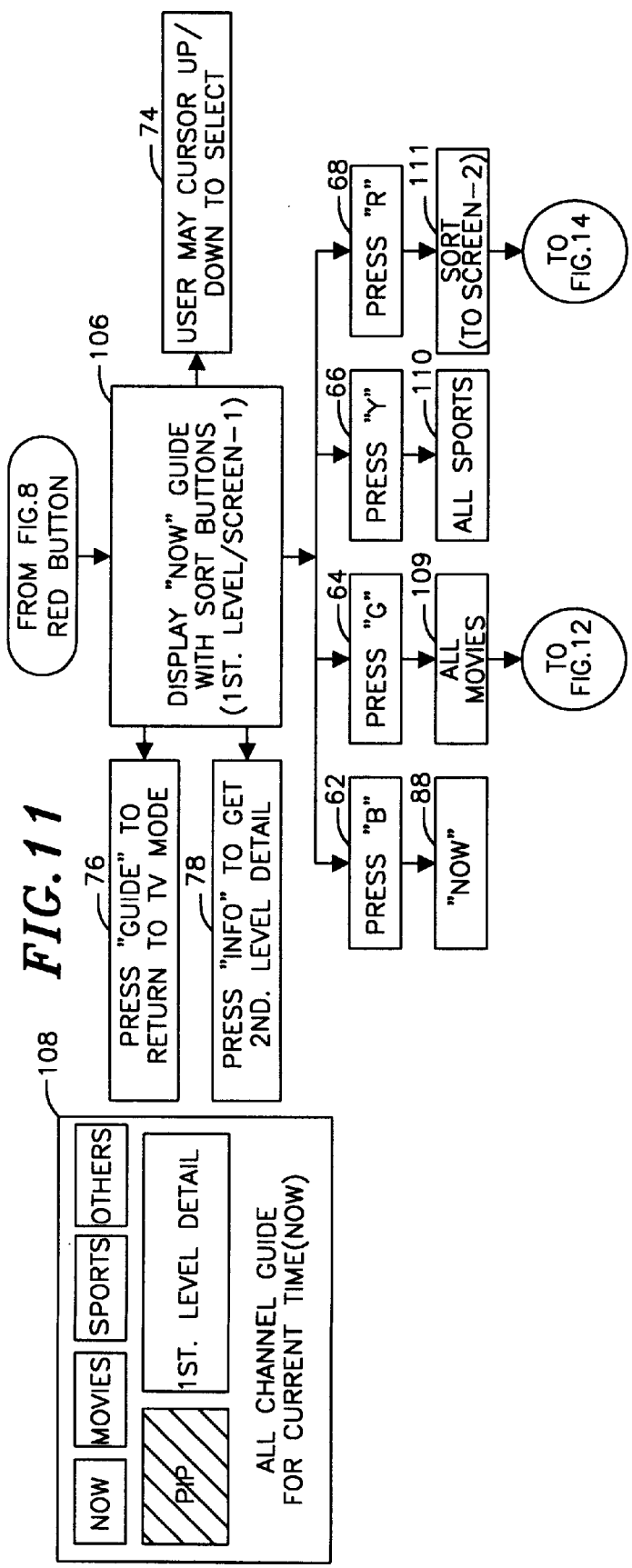
Figure 12:
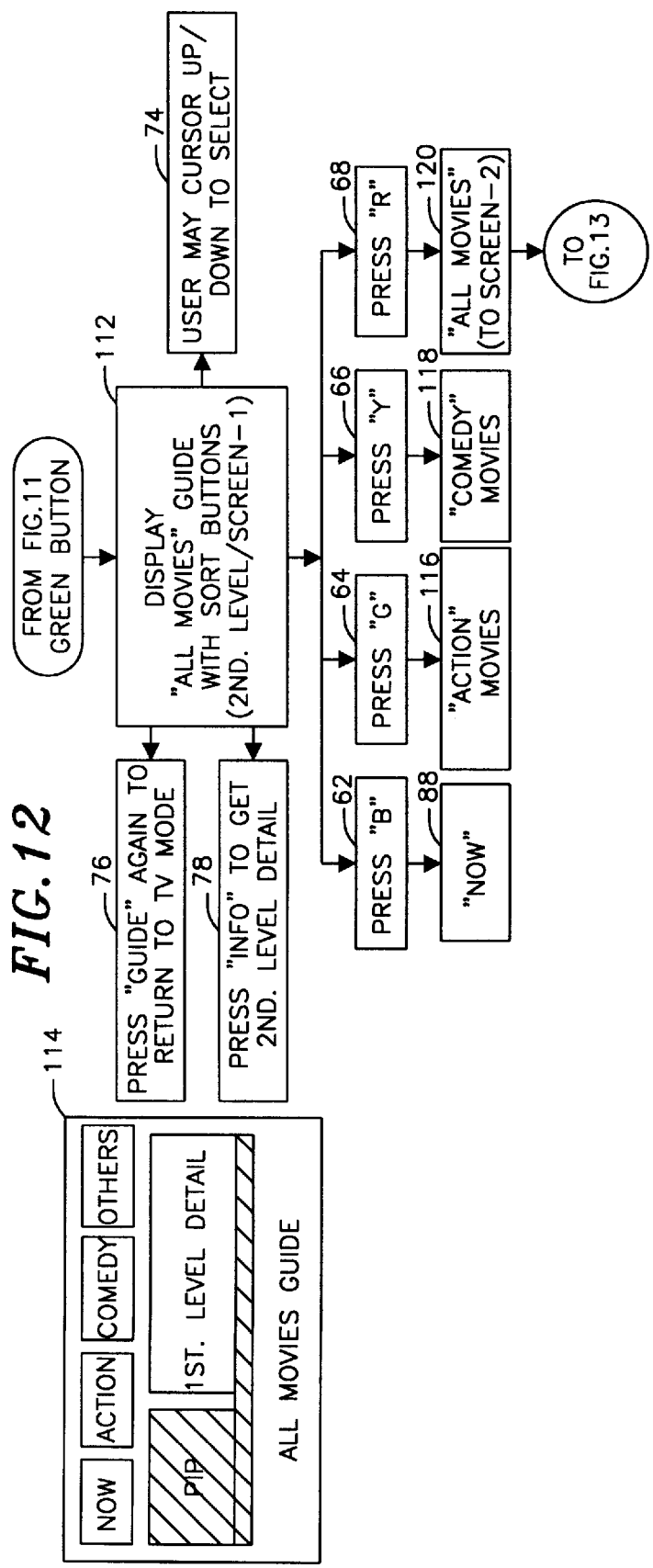
Figure 13:
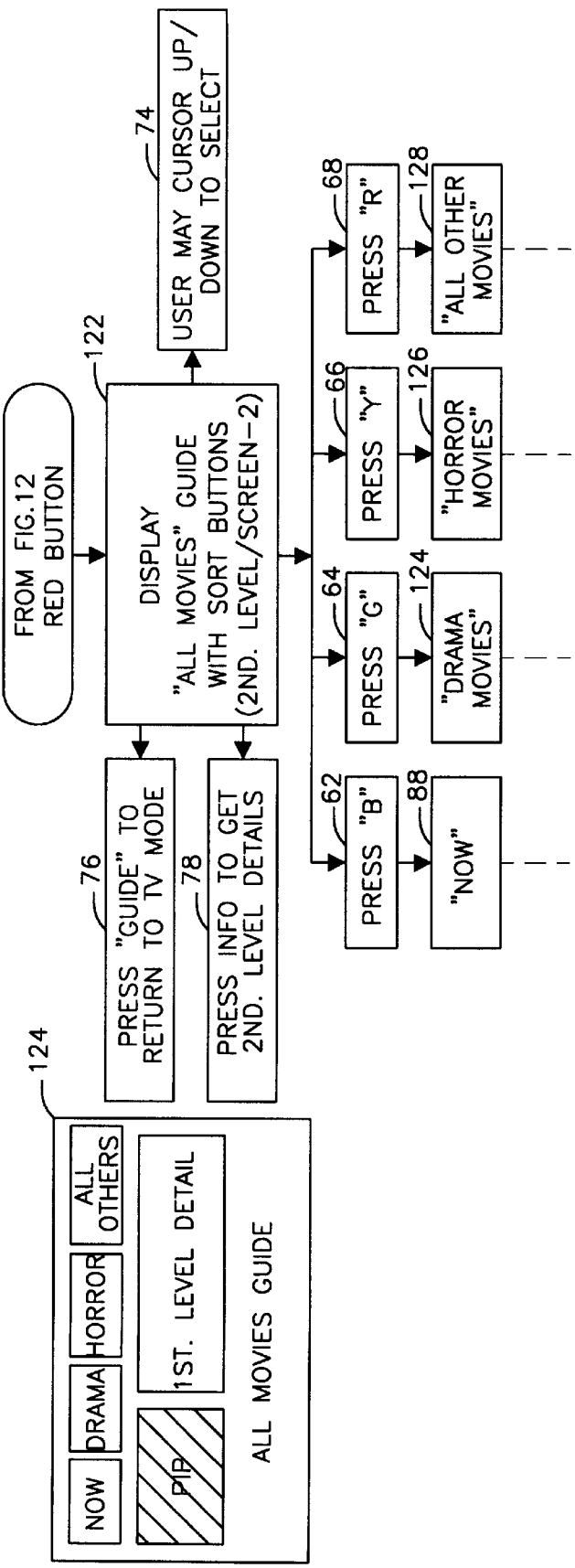

As represented by a box 105 in FIG. 8 and a box 106 in FIG. 11, a first level of "SORT" prompts is displayed when the viewer presses red button 68 while in the ALL CHANNEL guide. As depicted by a box 108 (FIG. 11), in addition to the blue NOW prompt, there are a first level of SORT buttons that comprise a green MOVIES prompt, a yellow SPORTS prompt, and a red OTHERS prompt in area 43. The ALL CHANNEL guide for the current time, i.e., NOW guide remains displayed in area 46. When the viewer presses green button 64, an "ALL MOVIES" guide is displayed in area 46, as represented by a box 109 in FIG. 11 and a box 112 in FIG. 12, and screen-1 of a second level, i.e., subtheme, of movie SORT buttons is displayed in area 43, as represented graphically in a box 114 in FIG. 12. When the viewer presses blue button 62, the NOW guide is displayed in area 46, as represented by a box 130 in FIG. 14 and screen-2 of the first level, i.e., the SORT buttons, is displayed in area 43, as represented graphically in a box 111 in FIG. 11 and a box 132 in FIG. 14.

In addition to the blue NOW prompt, the screen-1, second level movie SORT buttons (FIG. 12) comprise a green ACTION prompt, a yellow COMEDY prompt and a red OTHER prompt for calling up a screen-2 series of SORT buttons to permit selection of other subcategories of movies. In the ALL MOVIES guide, the sum of all the movies in all the subcategories are displayed. When the viewer presses green button 64, an ACTION MOVIES guide (not shown) is displayed in area 46. When the viewer presses yellow button 66, a COMEDY MOVIES guide (not shown) is displayed in area 46. In each of these cases, only a blue prompt is displayed in area 43 because the electronic guide is at the bottom of the hierarchy and the only route the viewer can take is to return to the NOW guide (FIG. 7). When the viewer presses green button 64, an ACTION MOVIES guide (not shown) is displayed in area 46. When the viewer presses yellow button 66, a COMEDY MOVIES guide (not shown) is displayed in area 46. In each of these cases, only a blue prompt is displayed in area 43 because the electronic guide is at the bottom of the hierarchy and the only route the viewer can take is to return to the NOW guide (FIG. 7). When the viewer presses red button 68, as represented by a box 120 in FIG. 12 and a box 122 in FIG. 13, the ALL MOVIES guide remains displayed in area 46 and the screen-2 series of second level movie SORT buttons is displayed in area 43. As represented graphically by a box 124, the screen-2 series of SORT buttons for the second movie level comprise, in addition to the blue NOW prompt, a green DRAMA prompt, a yellow HORROR prompt, and a red ALL OTHER prompt. When the viewer presses green button 64, a DRAMA MOVIES guide (not shown) is displayed in area 46. When the viewer presses yellow button 66, a HORROR MOVIES guide (not shown) is displayed in area 46. When the viewer presses red button 68, an ALL OTHER MOVIES guide (not shown) is displayed in area 46. In each of these cases, only a blue prompt is displayed in area 43 because the electronic guide is at the bottom of the hierarchy and the only route the viewer can take is to return to the NOW guide (FIG. 7).

The reason for multiple screens of prompts in the movie theme guide is to provide the number of prompts in area 43 to display all the subcategories of movies. Instead of an ALL OTHER movie prompt, a screen-3 series of second level movie SORT buttons could be displayed if more movie subcategories are desired. This pattern of screen could be extended as far as necessary to satisfy the need for subcategories.

Figure 14:
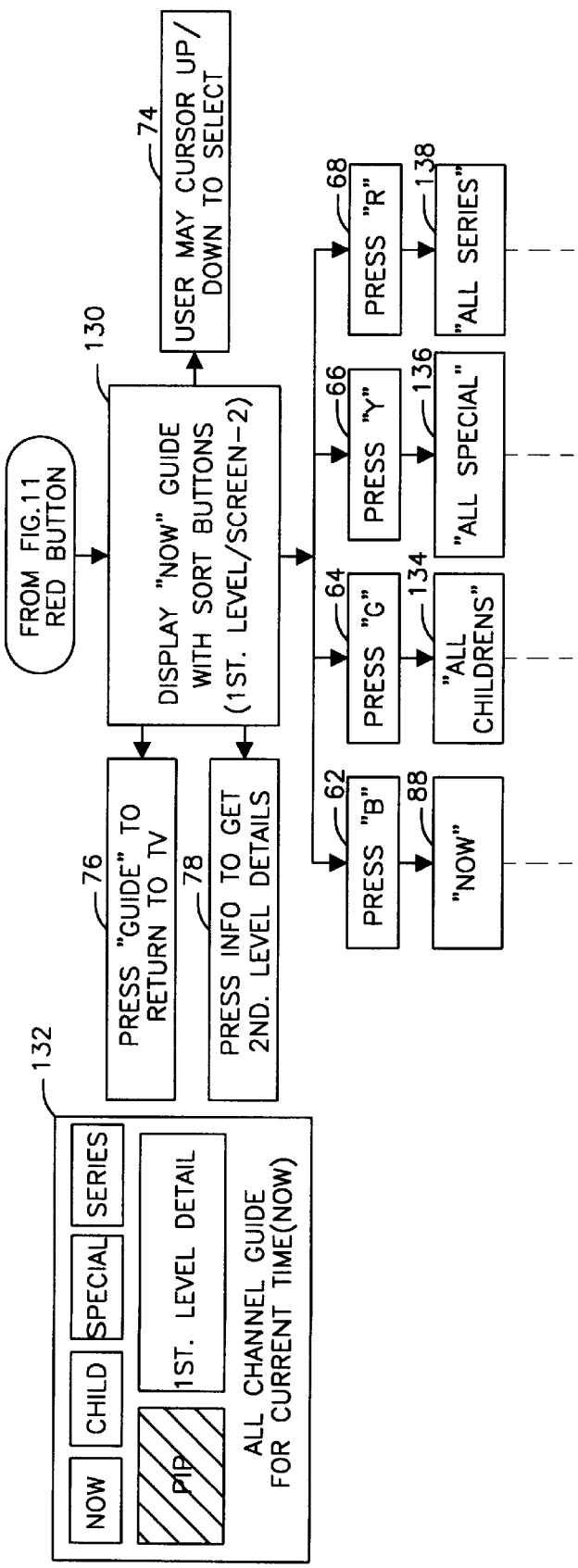

As represented in FIGS. 11 and 14, when the viewer presses red prompt button 68 in the first level of SORT buttons, a screen-2 of first level SORT buttons is displayed in area 43 and the NOW guide remains displayed in area 46. As depicted graphically by box 132, in addition to the blue NOW prompt, the screen-2 SORT buttons comprise a green CHILD prompt, a yellow SPECIAL prompt, and a red SERIES prompt. When the viewer presses green button 64, an ALL CHILDREN's guide (not shown) is displayed in area 46 as represented by a box 134. When the viewer presses yellow button 66, an ALL SPECIAL guide (not shown) is displayed in area 46 as represented by a box 136. When the viewer presses red button 68, an ALL SERIES guide (not shown) is displayed in area 46 as represented by a box 138. In each of these cases, only a blue prompt is displayed in area 43 because the electronic guide is at the bottom of the hierarchy and the only route the viewer can take is to return to the NOW guide (FIG. 7).

As represented by block 110 in FIG. 11, when the viewer presses yellow prompt button 66, an ALL SPORTS guide is displayed in area 46. Alternatively, there could be multiple levels and screens of sports SORT buttons in analogous fashion to the hierarchy of the movie prompts and guides. (Such a hierarchy could also be provided for any of the other categories of the SORT guide.)

Figure 15:
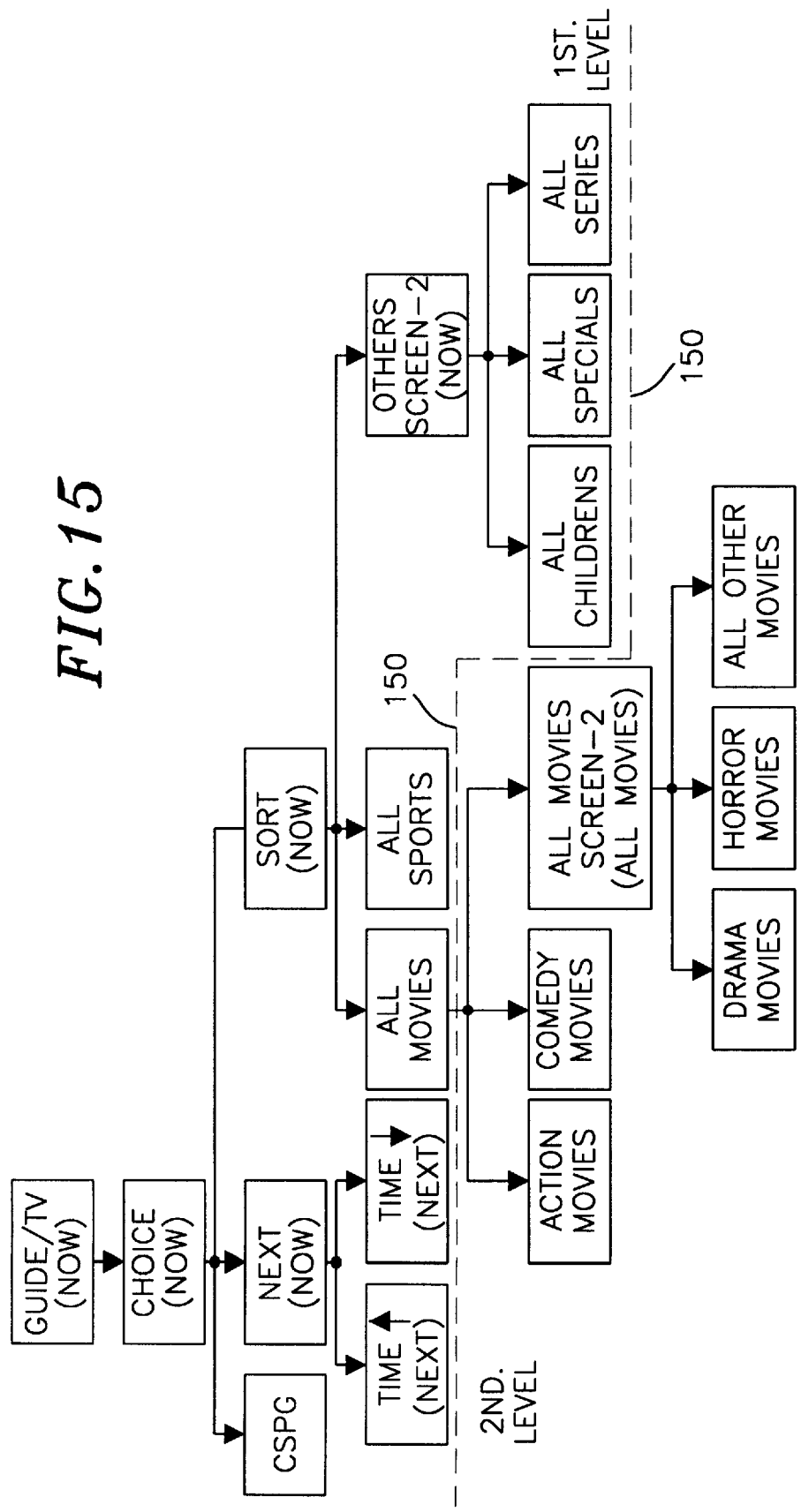
FIG. 15 is a schematic diagram depicting the hierarchy of prompts and guides shown in FIGS. 7 to 14.

FIG. 15 shows the hierarchy of prompts and guides described in connection with FIGS. 7 to 14, beginning with the entry into the electronic guide by pressing button 52 on the IR transmitter. The particular guide displayed on the screen in area 46 when a prompt is selected is designated in parentheses, e.g. the NOW guide is displayed when the CHOICE prompt is selected. In each case the guide remains unchanged from the preceding guide in the hierarchy. If no guide is designated in parentheses, the guide displayed when a prompt is selected is the same as the prompt, e.g., the THIS CHANNEL guide is displayed when the CSPG prompt is selected and the ALL MOVIES guide is displayed when the ALL MOVIES prompt is selected. Note that a broken line 150 depicts the levels of the SORT hierarchy—the first level lies above line 150 and the second level lies below line 150. At any level of the hierarchy, the viewer has two choices for navigating through the guide—select the BLUE prompt to return to the NOW guide or select one of the GREEN, YELLOW, or RED prompts to move to the following level. As stated above, the hierarchy of guides and prompts can be expanded to provide more themes by changing the ALL SERIES prompt to a OTHERS SCREEN-3 prompt and to provide more subthemes of movies by changing the ALL OTHER MOVIES prompt to a ALL MOVIES SCREEN-3 prompt, etc. Similarly, the hierarchy of guides and prompts can be expanded to provide subthemes for other themes, e.g., SPORTS, in the same manner as illustrated for MOVIES.

Figure 16:
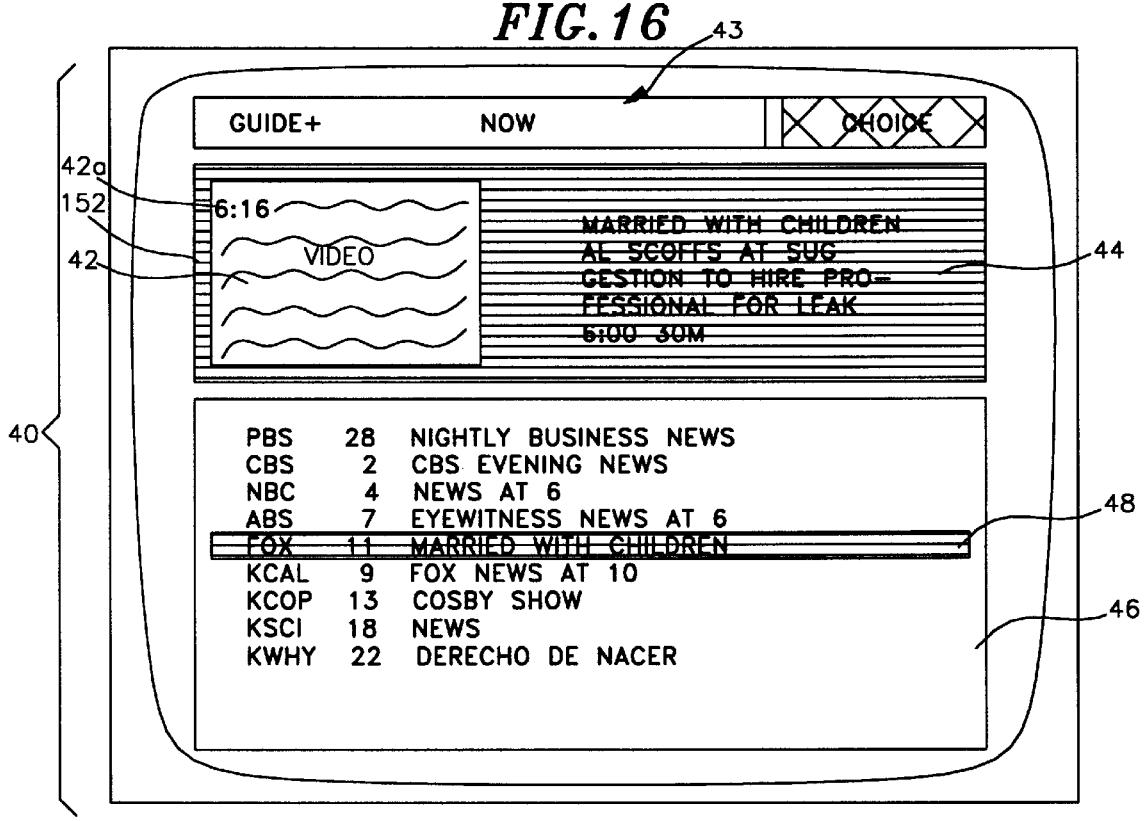
FIGS. 16 and 17 are screens formatted to designate by color coding the title of the program in the PIP window and the title of the program in the program description area.
Figure 17:
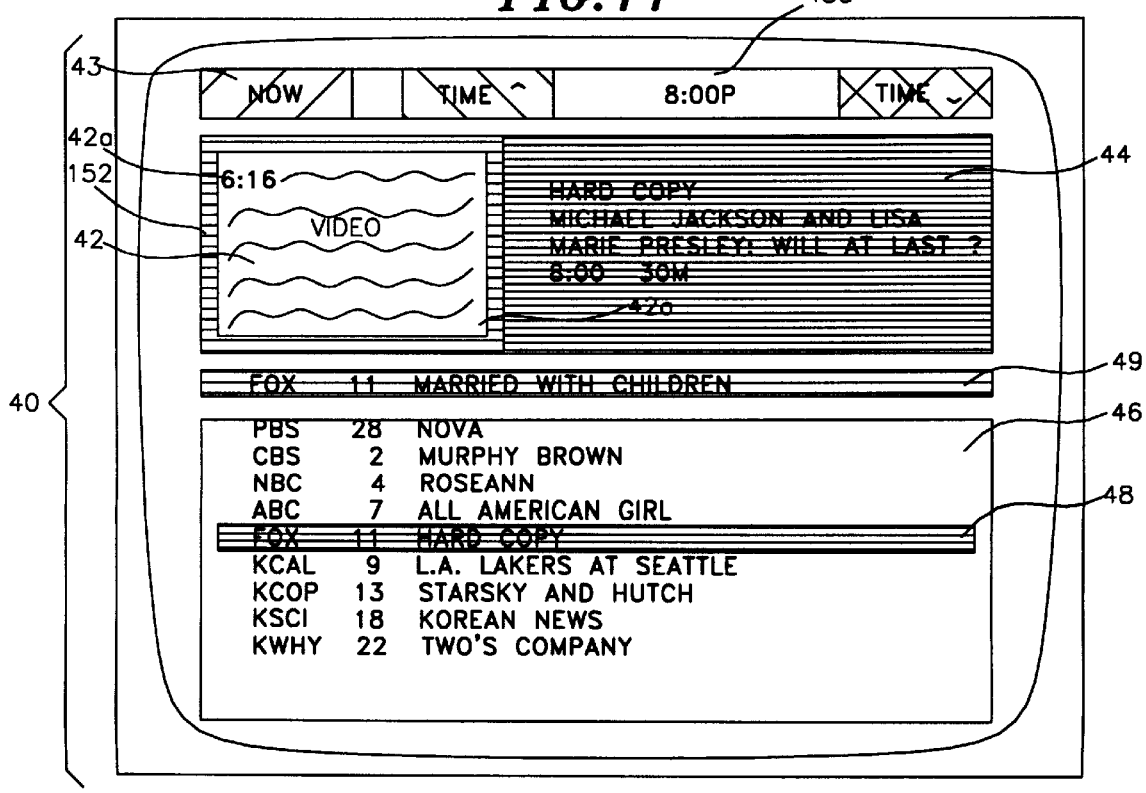

A feature of the invention that facilitates viewer orientation in the electronic guide is to color code PIP window 42 and program description area 44 consistently with the titles of the programs to which the information in these areas relate. Specifically, as illustrated in FIG. 16, in the NOW guide (FIG. 2) PIP window 42 has a border 152 that is the same color, e.g., dark blue, as the background of area 44 and cursor 48, which forms a color bar. Further, as illustrated in FIG. 17, in the NEXT guide (FIG. 3), as well as the THIS CHANNEL guide (FIG. 4) and the SORT guide (FIG. 5), where the description in area 44 relates to a different program than that displayed in PIP window 42, the background of area 44 is a different color or shade than border 152. The latter guides all have a cursor (color bar) 48 that identifies the title of the program described in area 44. For example, the background of area 44 and cursor 48 are light blue to signal to the viewer that the title highlighted by cursor 48 identifies the program described in area 44, while border 152 and banner 49 remain dark blue to signal that the title in banner 49 identifies the program in PIP window 42.

Figure 18:
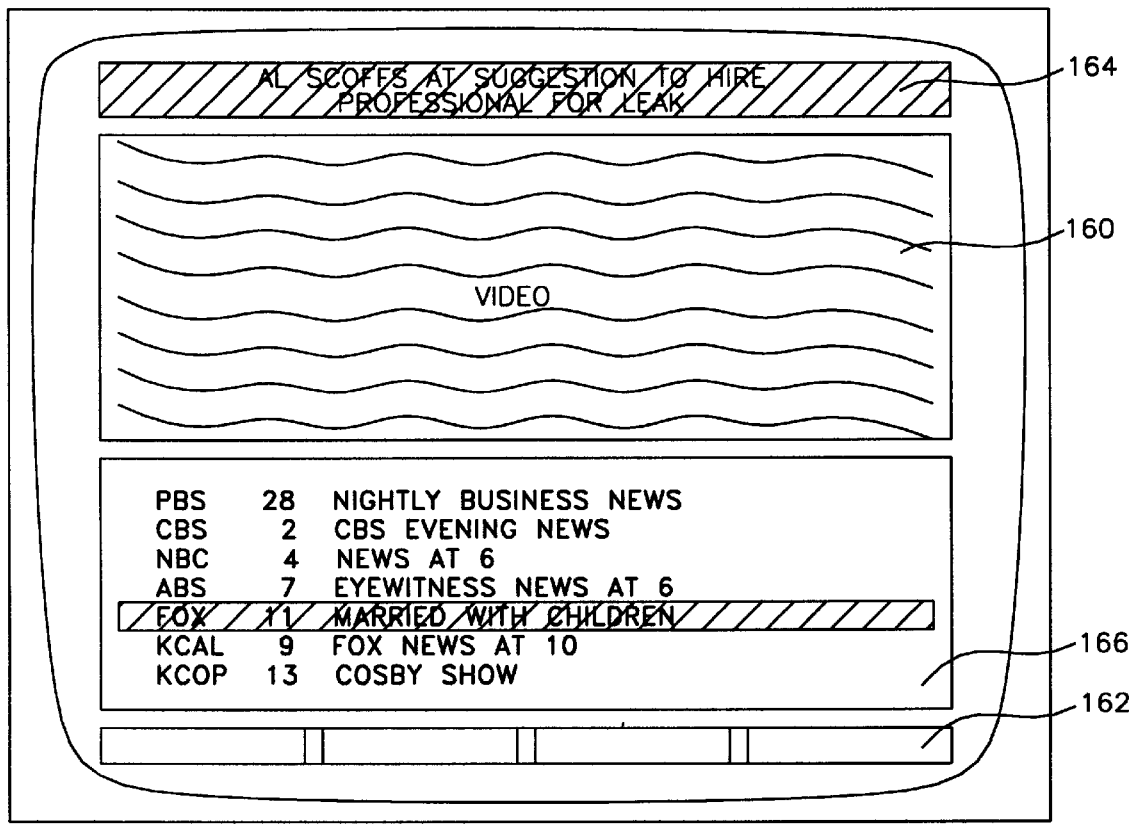
FIG. 18 is a screen formatted to display a real time television program with an electronic program guide, and thereby simulate the screen format of FIGS. 2, 3, 4, or 5, with a television receiver that does not have a PIP chip.

If the television receiver does not have a PIP chip, the described screen formats can be simulated by rearranging the prompts and the guide and program description information and overlaying such information over the real time moving images of the current television program. In contrast to the PIP format, this results in loss of part of the picture of the television program. But, the remainder of the picture, which is the center part of the image, together with the sound portion thereof generally convenes most of the essential information of the television program. In FIG. 18, such a simulation has a truncated real time picture area 160, instead of PIP window 42, a message prompting area 162, instead of area 43, a program description area 164, instead of area 44, and an electronic program guide area 166, instead of area 46.

Area 164 is located across the full width at the top of the screen area and preferably does not include the program title. Prompt area is at the bottom of the screen area and is otherwise like the PIP screen format described above. Guide area 166 is between areas 160 and 162 and preferably has several fewer lines of program listings than the PIP screen format. The size of the picture in area 160 is the same as the picture when the electronic guide is not operating, but the top and bottom parts of the picture are cut off by areas 162, 164, and 166. To implement this embodiment of the invention, the following changes in the television receiver of FIG. 1 are made:

- Microprocessor 24 is configured to format the screen as shown in FIG. 18, leaving blank area 160.
- PIP chip 19 is replaced by a video mixer.

Figure 19:
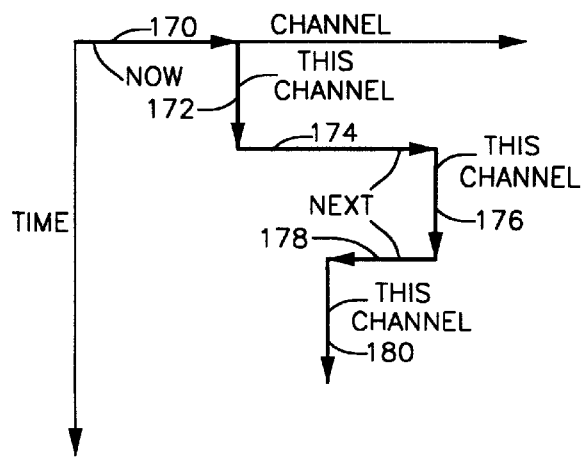
FIG. 19 is a graph illustrating an alternative way for the viewer to navigate through the television program guide.

FIG. 19 illustrates another way to navigate through the electronic guides described above. The abscissa represents time and the ordinate represents channel. As represented by a line 170, starting in the NOW guide, the viewer moves the cursor from channel to channel and current programs are displayed in the PIP window. As represented by a line 172, the viewer selects the THIS CHANNEL guide and moves the cursor from time slot to time slot. The program on the channel to which the tuner was last set in the NOW guide remains displayed in PIP window 42 and the description of the program on said channel at the time slot highlighted by the cursor is displayed in area 44. As represented by a 174, the viewer selects the NEXT guide and moves the cursor from channel to channel. The program on the channel to which the tuner was last set in the NOW guide remains displayed in PIP window 42 and the description of the program on the channel highlighted by the cursor at the time slot last highlighted in the NEXT guide is displayed in area 44. As represented by a line 176, the viewer again selects the THIS CHANNEL guide and moves the cursor from time slot to time slot. The program on the channel to which the tuner was last set in the NOW guide remains displayed in PIP window 42 and the description of the program on the channel last highlighted in the NEXT guide at the time slot currently highlighted by the cursor is displayed in area 44. As represented by a line 178, the viewer selects the NEXT guide and moves the cursor from channel to channel. The program on the channel to which the tuner was last set in the NOW guide remains displayed in PIP window 42 and the description of the program on the channel highlighted by the cursor at the time slot last highlighted in the NEXT guide is displayed in area 44. As represented by a line 180, the viewer again selects the THIS CHANNEL guide and moves the cursor from time slot to time slot. The program on the channel to which the tuner was last set in the NOW guide remains displayed in PIP window 42 and the description of the program on the channel last highlighted in the NEXT guide at the time slot currently highlighted by the cursor is displayed in area 44. In this manner the viewer can navigate either into the future or toward the current time and across channels to determine the television program schedule.

In summary, rather than navigating through a two dimensional (time/channel) grid guide, the technique described in connection with FIG. 19 isolates the two dimensions, i.e., time and channel, and displays all the channels at any time selected by the viewer or all the times on any channel selected by the viewer.

Another feature that is particularly useful in the NOW guide calls for the temporary selective elimination of program listings by viewer command. Thus, in the NOW guide when the viewer is not interested in a displayed program, the viewer can move the cursor to the unwanted program and press a dedicated DELETE button (not shown) on the IR transmitter or an existing function button such as ENTER. The microprocessor is configured to delete the listing for the program from the NOW guide and to block the tuner from being set to the channel that carries the unwanted program. As a result, the viewer can graze through the programs of interest much more quickly. When the unwanted program is finished, the microprocessor unblocks the tuner from being set to the channel and displays the next program on the channel in the NOW guide. If desired, the microprocessor can be configured to keep the tuner blockage in effect in the THIS CHANNEL guide and the normal television mode.

A variation of the above feature is to configure the microprocessor to display the unwanted programs marked with the cursor in a manner that distinguishes from the wanted programs, e.g., in a half gray scale. When the viewer moves the cursor to the unwanted program and presses the DELETE button, the microprocessor is configured to display the unwanted program in the half gray scale, to prevent the cursor from highlighting the unwanted program, and to block the tuner from being set to the channel that carries the unwanted program. Since the unwanted program is still visible, the viewer can change his or her mind before the end of the unwanted program. Thus, the microprocessor is configured to return the program display to normal, to permit the cursor to highlight the program, and to unblock the tuner, when a special cursor control sequence is executed. For example, the sequence could be to move the cursor to the program listing immediately above the unwanted program or series of programs, press the right arrow button to permit movement of the cursor to the unwanted program or programs, highlight with the cursor the unwanted program that it is desired to restore, and then press the DELETE button.

As described in more detail below, in program schedule memory 22, the program listings are coded by day of the week, time of day, and channel so that they can be accessed by microprocessor 24 when necessary to supply program schedule information to video processor 30 to compose the program listings and the program descriptions. Microprocessor 24 has a real time clock (not shown), the time of which is compared with the time of day and day of the week codes to select the program listings for the TISPG mode. The functional storage areas of cursor position register 32 are mapped to the storage areas of video processor 30 where the program schedule is formatted for display on background area 40 so cursor position register 32 points to the area of the screen, and thus the particular program, that is highlighted by cursor 48. By comparing the cursor position in register 32 with the channel corresponding to the highlighted area of video processor 30, the channel of the highlighted program is derived and coupled to microprocessor 24. Microprocessor 24 then sets tuner 11 to this channel.

In TISPG operation, microprocessor 24 recalls the appropriate program listings from memory 22 and transmits them to video processor 30 where the program listings of area 46 and the program description of the highlighted program in area 44 are composed. At the same time, microprocessor 24 operates switch 18 so the output of tuner 11 is directly connected to the one input of PIP chip 19 and switches PIP chip 19 into a PIP mode, such that the input from tuner 11 is displayed in the PIP window and the program schedule from video processor 30 is displayed in the background. Microprocessor 24 senses the channel to which the tuner is set when the TISPG mode is entered, and initially positions cursor 48 at the program listing broadcast on this channel. As the viewer moves the up/down arrows of the cursor control key set, tuner 11 is reset accordingly and new program schedule information is fed through microprocessor 24 to video processor 30 to recompose the program listings so cursor 48 remains visible and the program description remains current. The described TISPG mode facilitates channel grazing by the viewer. When the viewer finds the video program he or she wishes to watch, the viewer leaves the TISPG mode. As a result, microprocessor 24 switches PIP chip 19 out of the PIP mode, such that the video program inputted from tuner 11 is displayed full screen.

If the viewer wishes to record the program highlighted in the TISPG mode, the viewer commands microprocessor 24 to turn on VCR 17 for recording.

If the viewer wishes to play a video tape cassette on VCR 17, the viewer commands microprocessor 24 to turn on VCR for playback and to operate switch 18 for connection of the output of VCR 17 through PIP chip 19 to television receiver 20.

The television receiver of FIG. 1 can also be used with the format of FIGS. 3, 4, or 5 in an extension of the CSPG mode to display previews of future programming as video clips. The video clips are stored on a video tape cassette that is loaded into VCR 17. The addresses of the video clips on the tape of the video cassette are stored in program schedule memory 22 as part of the data base. These addresses are linked to the respective future program listings in the data base so that a video clip can be accessed on the tape when a program listing is designated in the database. When the viewer presses the CSPG mode key, in addition to the operation as described in connection with FIG. 4, microprocessor 24 places the current program title in banner 49, as illustrated in FIG. 4. So long as cursor 48 highlights the title of the current program, the CSPG mode operates as described above. When the viewer moves cursor 48 vertically by operating the cursor control key set on viewer input device 28 to highlight the title of a future program displayed in area 46, the address of the video clip of the highlighted program listing is retrieved by microprocessor 24 from program schedule memory 22 and transmitted to VCR 17. The video clip is retrieved from the tape in VCR 17 and coupled through switch 18 and PIP chip 19 to television receiver 20 for display in PIP window 42. The video clips on the tape of the videocassette are indexed and accessed in the manner described in co-pending application Ser. No. 08/176, 852, filed on Dec. 30, 1993 and entitled ENHANCING OPERATIONS OF VIDEOTAPE CASSETTE PLAYERS, the disclosure of which is incorporated fully herein by reference.

An extension of the TISPG mode illustrated in FIG. 2 also permits display of video clips of future programming. Specifically, in the time-channel grid format microprocessor 24 also controls cursor 48 responsive to the cursor key set of viewer input device 28, which in this embodiment includes a horizontal cursor control, such as a pair of right/left arrows. As described above, the address for the highlighted future program listing is retrieved by microprocessor 24 from program schedule memory 22 and transmitted to VCR 17 to access the corresponding video clip, which is displayed in PIP window 42.

Another embodiment in which video clips can be displayed in PIP window 42 is illustrated in FIG. 5. In addition to banner area 43 and program description area 44, background area 40 has program schedule area 46, in which program listings are displayed by theme such as movies, sports, current events, etc. Area 46 contains a column for program start time, a column for program channel, and a column for program title. To implement this embodiment, the program listings of the data base stored in program schedule memory 22 are also coded by theme so that they can be accessed by microprocessor 24 in response to the viewer selection of themes from an on-screen menu in well known fashion. As described in connection with the extended TISPG and CSPG modes described above, when the title of a future program listing is highlighted by cursor 48, the corresponding moving image video clip is displayed in PIP window 42. If desired, a video disc player could be substituted for VCR 17 to provide the video clips to switch 18 in order to speed up the access time to the moving images displayed in PIP window 42.

Figure 20:
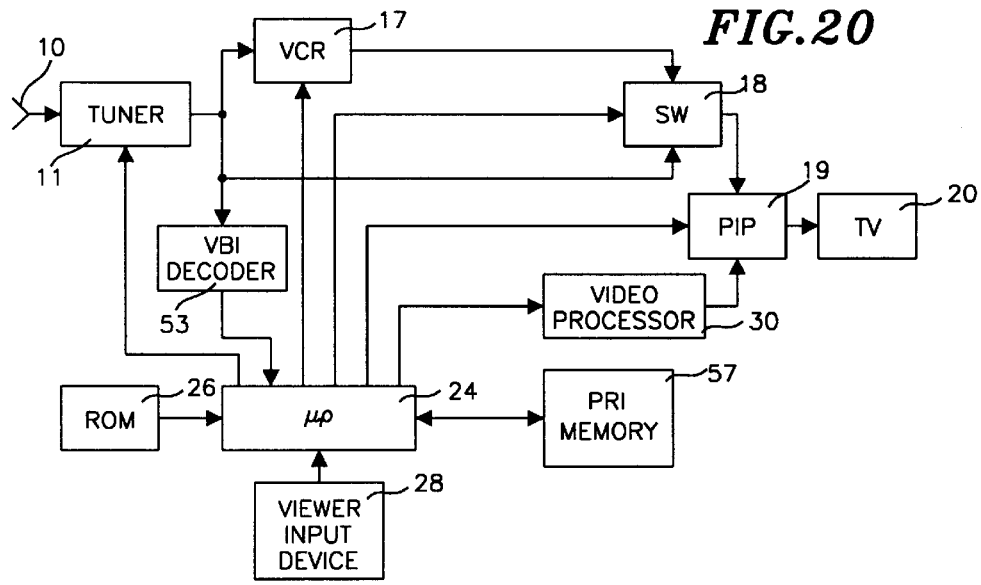
FIG. 20 is a schematic block diagram of a television receiver that has an electronic television program guide that displays PRI in accordance with the principles of another embodiment of the invention.

In another embodiment, program related information (PRI) is displayed in background area 40 while the real time television program to which the PRI relates is displayed in PIP window 42. The PRI is transmitted in the vertical blanking interval (VBI) of the television signal of the channel carrying the television program to which the PRI relates, contemporaneously with this television program. As illustrated in FIG. 19, to implement this embodiment a VBI decoder 53 is connected between the output of tuner 11 and microprocessor 24 and a PRI memory 57 is connected to microprocessor 24 as shown in FIG. 20. The PRI is stripped from the VBI of the television signal by decoder 53 and stored in memory 57 by microprocessor 24.

Figure 21:
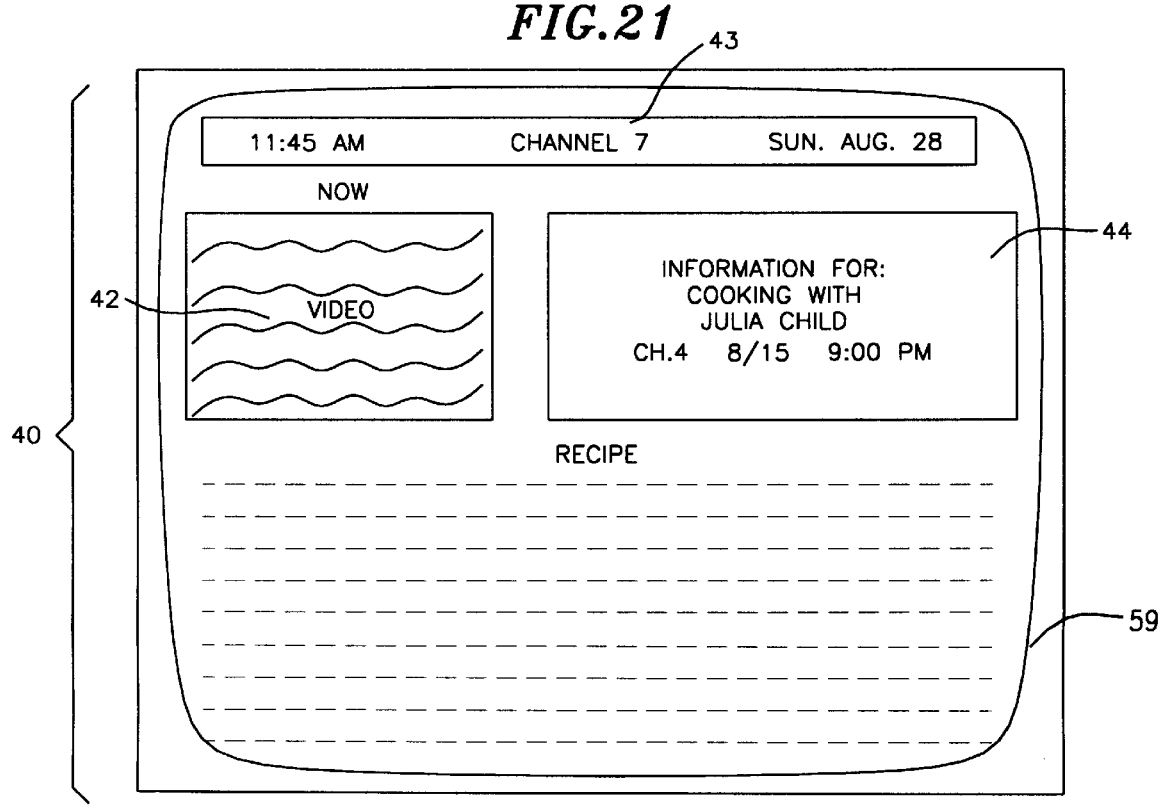
FIG. 21 is a screen formatted to display the PRI recovered by the receiver of FIG. 20.

In operation, when the viewer presses a PRI key on viewer input device 28 the real time television program of the channel to which tuner 11 is set is displayed in PIP window 42. In addition to banner area 43 and program description area 44, background area 40 has a PRI area 59 in which different types of PRI are displayed. In FIG. 21 the real time television program is a cooking demonstration by Julia Child and the PRI displayed in area 59 is a recipe made in the course of the demonstration. Other information about the program is displayed in area 44. Another example for the real time television program could be a commercial for Lexus automobiles and the PRI displayed in area 59 could be a test drive offer for Lexus. The name and address of the local Lexus dealer in the geographic area of the viewer might be displayed in area 44.

Figure 33:
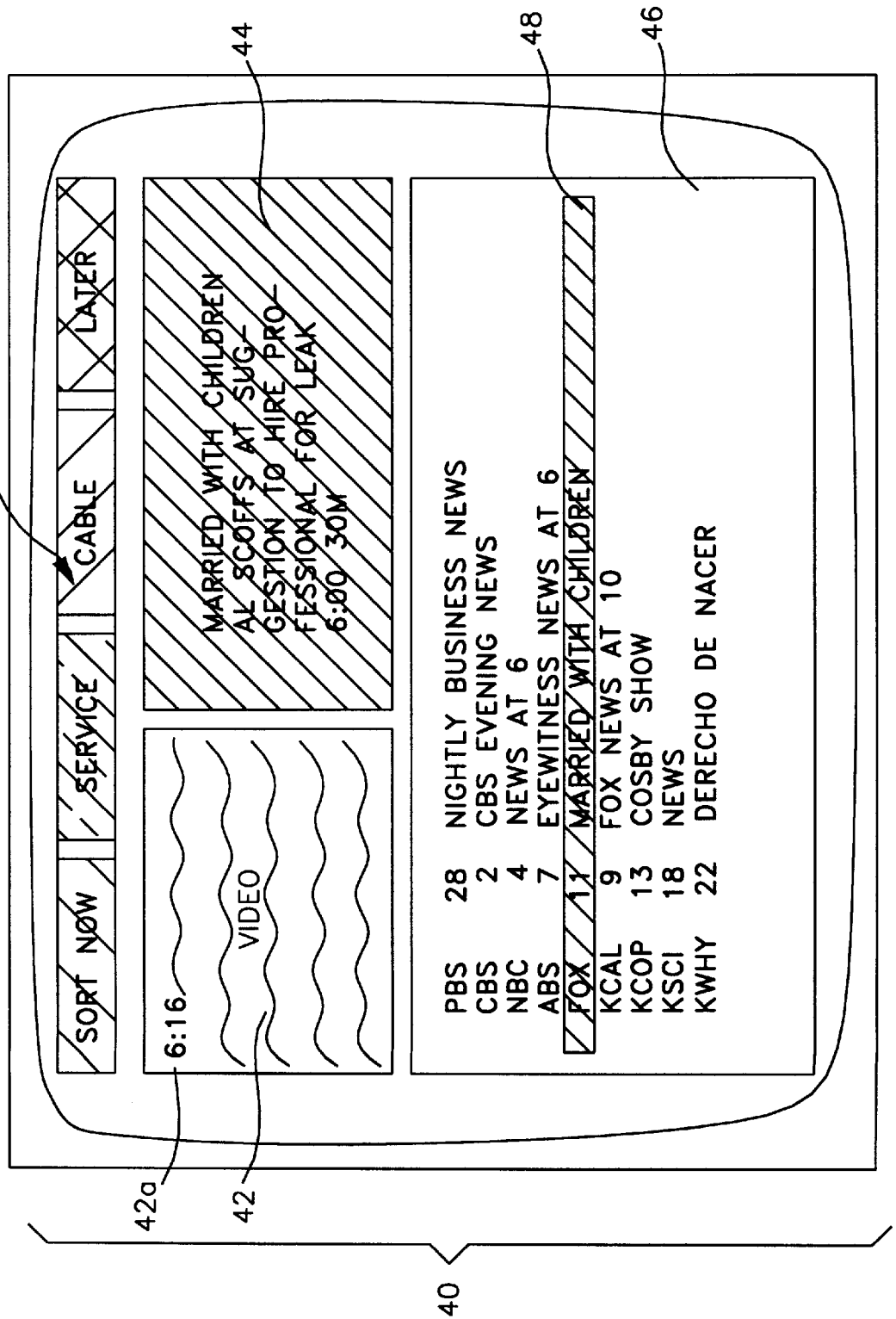
FIGS. 33 to 35 are television screens formatted in accordance with another embodiment of the invention.

Another version of the NOW guide is shown in FIG. 33. This version is the same as the guide of FIG. 2 except for the prompts in area 43, which are SORT NOW, SERVICE, CABLE, and LATER. The SORT NOW prompt permits the viewer to sort by theme, and thus reduce the number of displayed programs, by "filtering out" all the programs that do not meet a selected theme. The SERVICE prompt permits the viewer to enter a mode in which a number of various items of information such as news, weather, sports scores, or financial data can be selected for display. The CABLE prompt permits the viewer to obtain information unique to the particular cable system such as pay per view offerings or special promotions on premium channel packages. The LATER prompt permits the viewer to advance to the screen shown in FIG. 8 and continue to navigate as described in connection with FIGS. 8 to 15.

Figure 34:
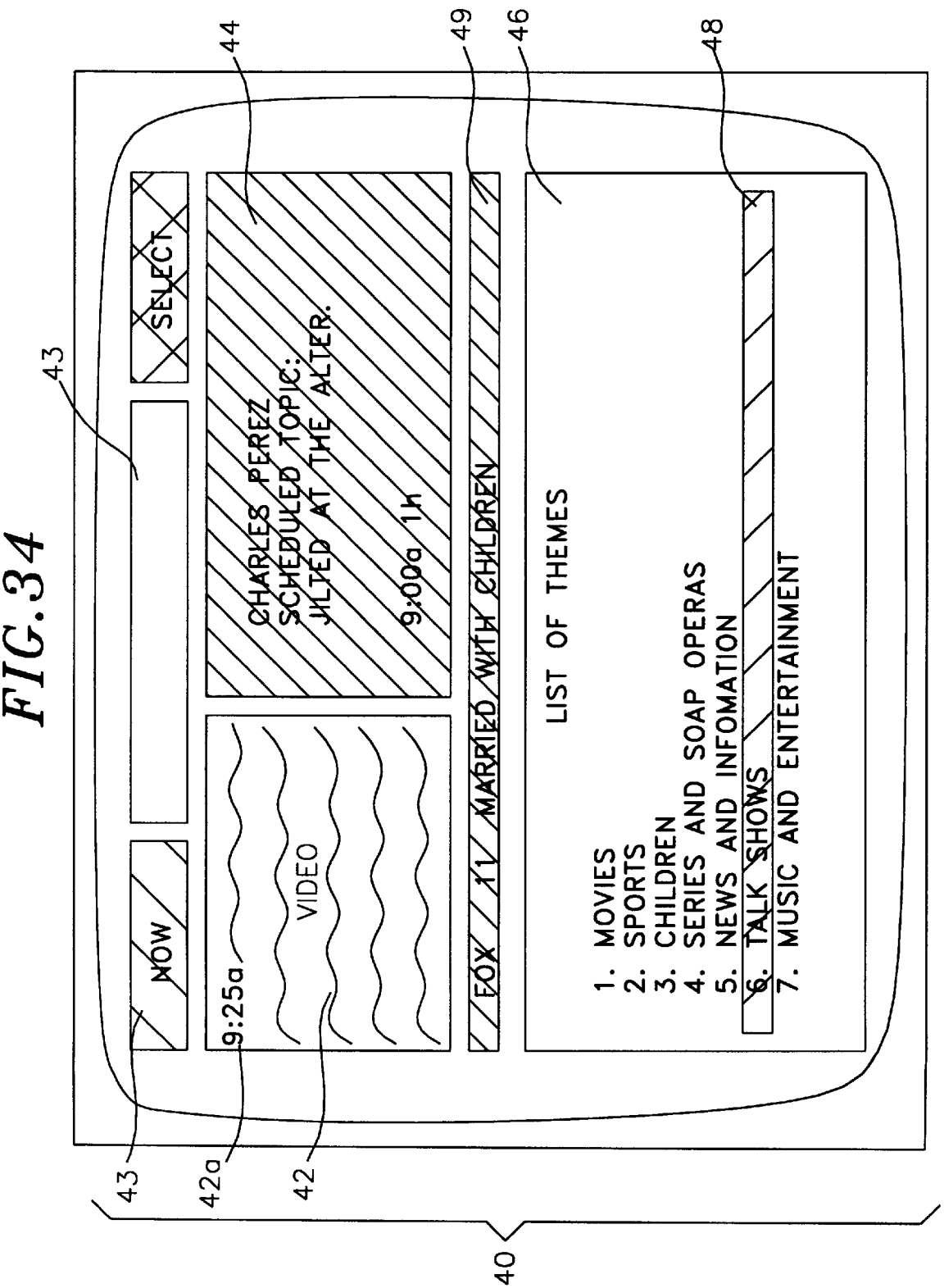

In FIG. 34, the prompts in area 43 are NOW and SELECT. The real time images of the last program highlighted by cursor 48 in area 46 of the NOW guide are displayed in PIP window 42, the program description of this program is displayed in area 44, and the title and channel of the program are displayed in banner 49. A list of program themes is displayed in area 46, instead of program listings. Any of the themes can be highlighted by cursor 48.

Figure 35:
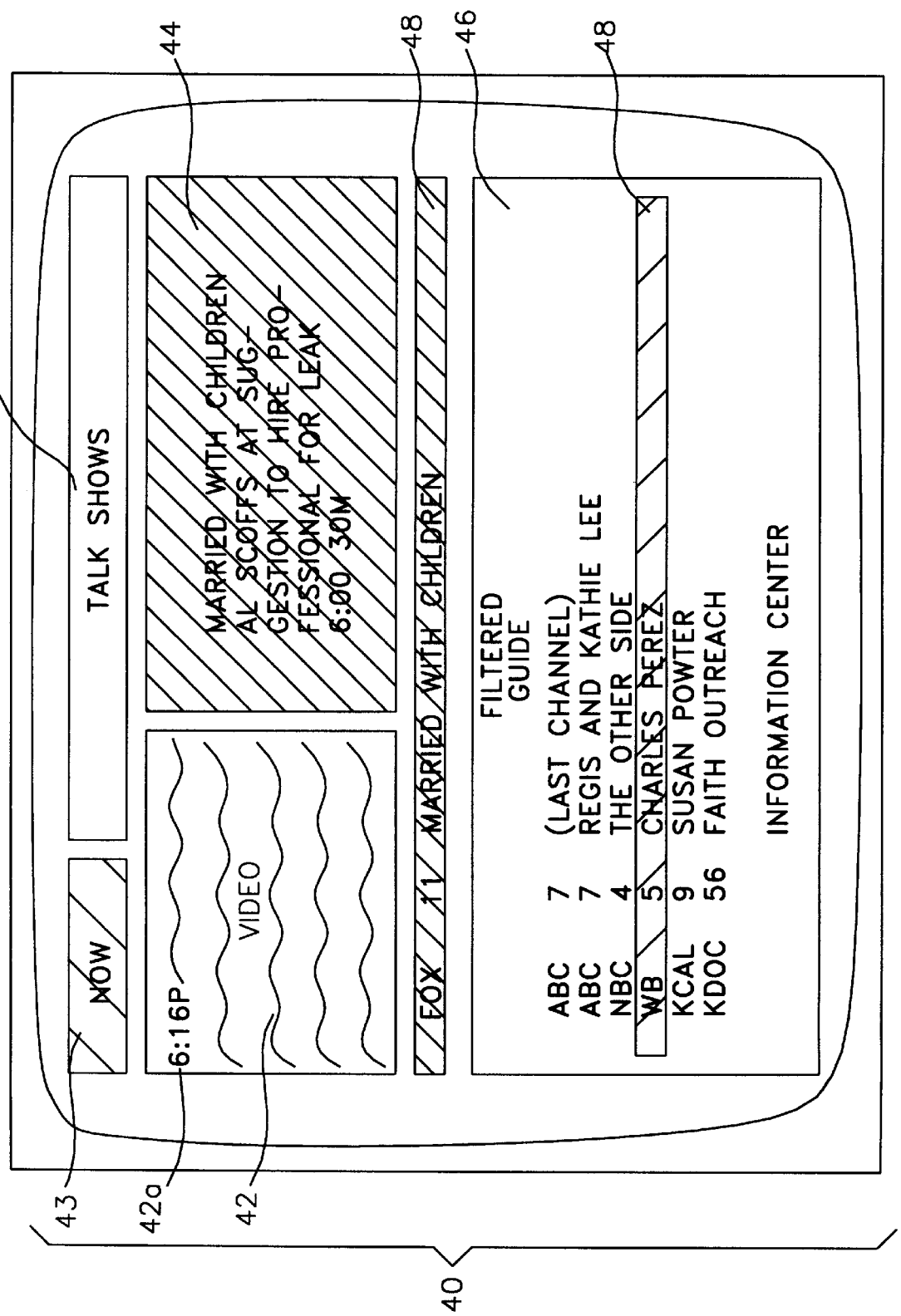

In FIG. 35, the NOW prompt and a selected theme are displayed in area 43. A list of the current programs meeting the selected theme identified in area 43 is displayed is area 46. As in the NOW guide of FIG. 2, when the viewer moves cursor 48 from program to program in area 46, the real time images of the highlighted program are displayed in PIP window 42 and the program description is displayed in area 44. By thus filtering out the programs meeting the other, nonselected themes, the list of displayed current programs can be sharply reduced. This facilitates channel grazing the programs of interest to the viewer in PIP window 42 because the viewer has fewer programs to highlight with cursor 48.

Reference is made to FIGS. 36 to 39 for a description of the steps taken by the viewer to navigate about the television program guide of the preferred embodiment described in connection with FIGS. 6 to 14 modified to incorporate the screens of FIGS. 33 to 35. Microprocessor 24 is programmed to carry out the described operations.

Figure 36:
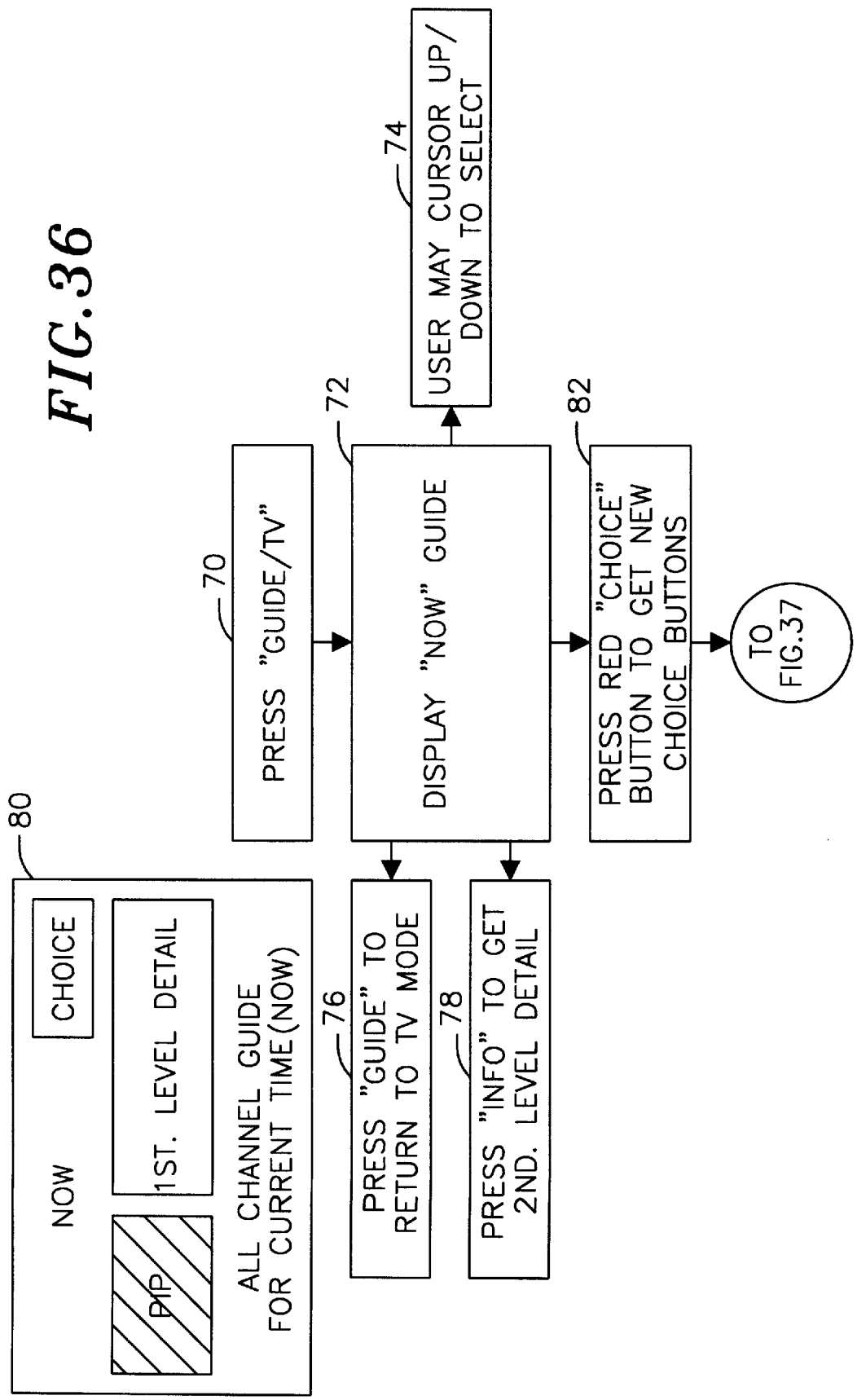
FIGS. 36 to 38 are flow diagrams showing how a viewer navigates through the electronic program guide of FIG. 1 that includes the screen formats of FIGS. 33 to 35.
Figure 37:
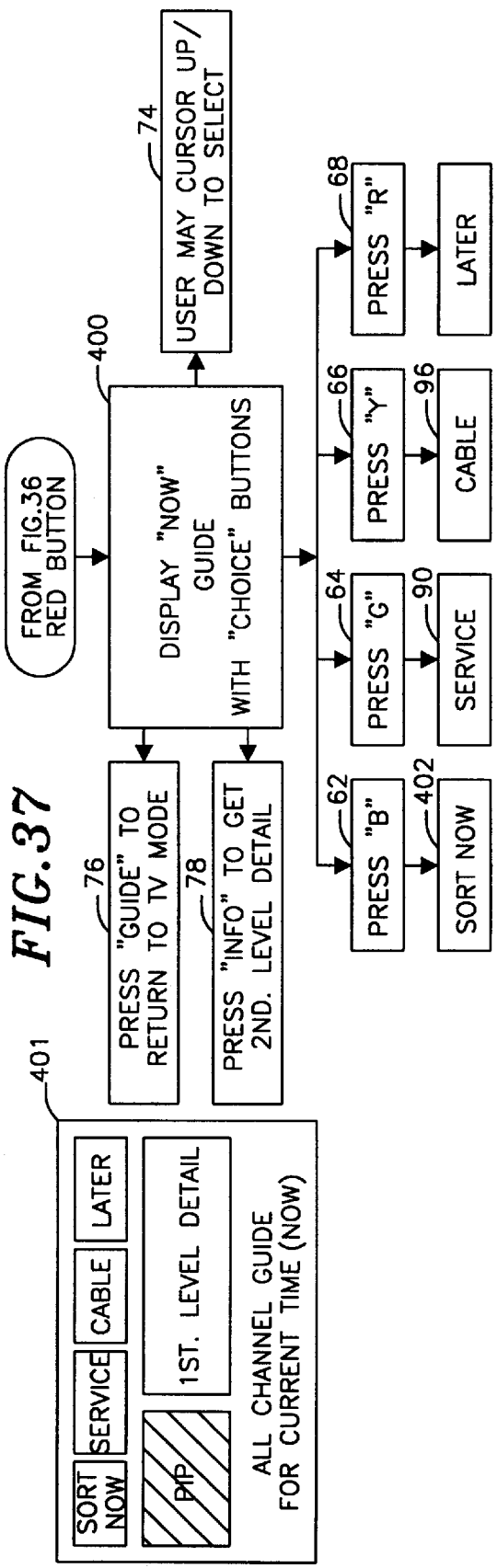

FIG. 36 is the same as FIG. 7 except that the flow is to FIG. 37, instead of FIG. 8. Thus, when the viewer enters the electronic guide by pressing GUIDE/TV button 52 on the remote transmitter, the NOW guide is displayed on the screen. When the viewer presses red button 68 on the remote transmitter, four prompting choices are presented to the viewer. As represented by a block 400 in FIG. 37, these prompting choices are displayed in an "ALL CHANNEL" guide.

Block 401 represents an "ALL CHANNEL" guide, which is identical to the "NOW" guide except for area 43. This is a transition guide in that it permits the viewer to enter the other modes described above in connection with FIG. 33. In this "ALL CHANNEL" guide, a blue SORT NOW prompt, a green SERVICE prompt, a yellow CABLE prompt, and a red LATER prompt are displayed. In this guide, the viewer cannot return directly to the NOW guide. To return to the NOW guide, the viewer must first return to the TV mode by pressing button 52.

Figure 38:
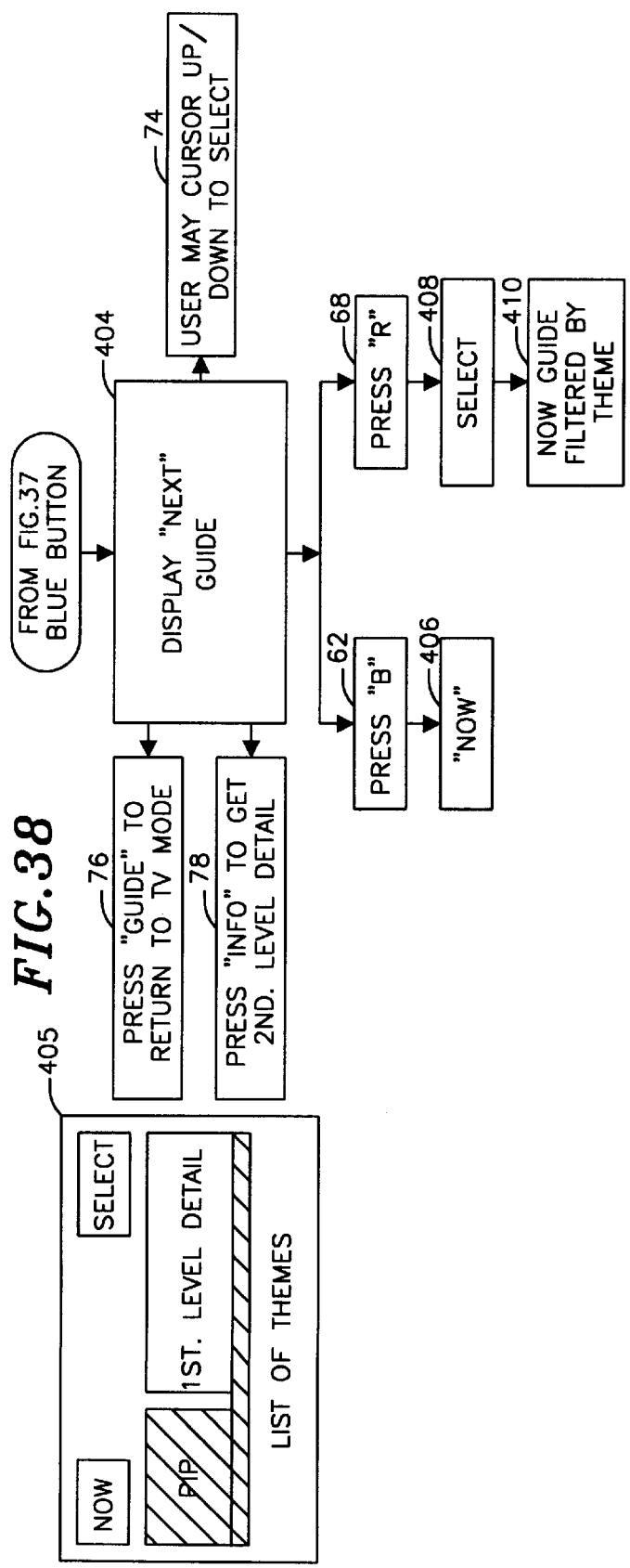

As represented by a box 402 in FIG. 37 and a box 404 in FIG. 38, when blue button 62 is pressed from this ALL CHANNEL guide, the list of themes is displayed. In FIG. 38, as represented by a block 405 a blue NOW prompt and a red SELECT prompt are displayed. When the viewer presses blue button 62, the NOW guide is displayed in area 46, as represented graphically by a box 406. To select a theme, the viewer, operates arrow buttons 58 and 60 to highlight the selected theme and then presses red button 68, as represented by box 68, to select the theme as represented by a box 408. Thereupon, the NOW guide filtered by theme is displayed in area 46, as represented by a box 410. Instead of a single theme, microprocessor 24 could be programmed to select two or more themes, in which case the current programs meeting all the selected themes would be displayed.

Figure 39:
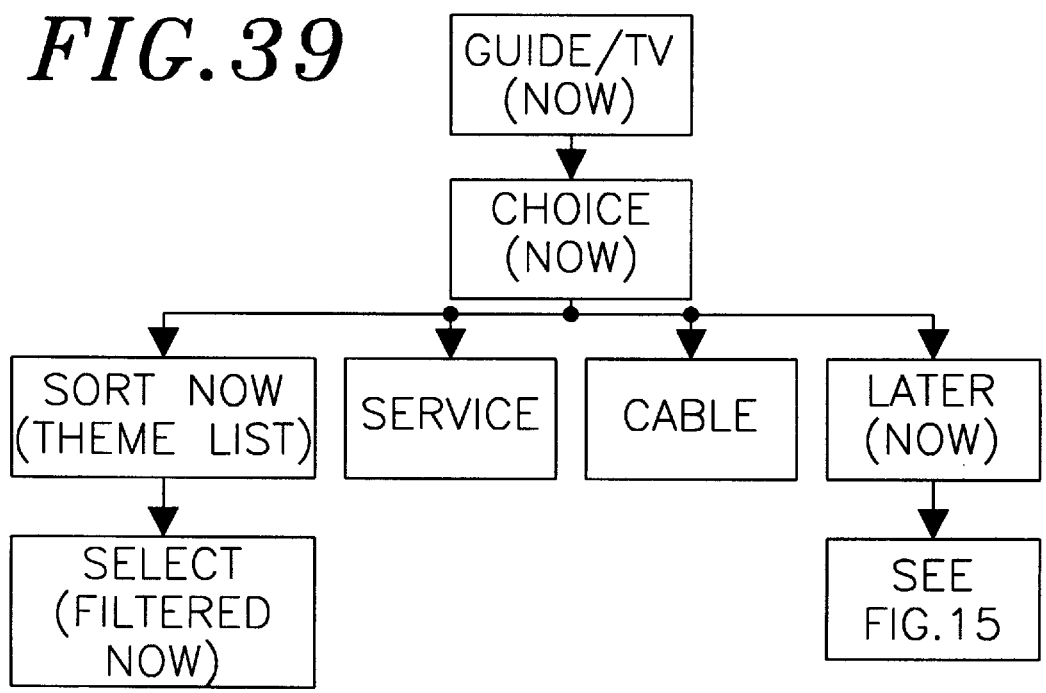
FIG. 39 is a schematic diagram depicting the hierarchy of prompts and guides shown in FIGS. 36 to 38.

FIG. 39 shows the hierarchy of prompts and guides described in connection with FIGS. 35 to 37. The hierarch shown in FIG. 15 is incorporated into the hierarchy of FIG. 39 as illustrated.

Data Base Operations

In the preferred embodiment, the system contains a data base used to store all the information needed to create the program guides and to carry out requests, such as requests to record specific future programs. The data base is stored in program schedule memory 22 and is directly accessible by the system microprocessor 24. The data base is divided into a static area 300 and a dynamic area 301. The static area contains several pre-allocated tables used to store, locate and search data for the creation of program guides. The dynamic area is used to store actual television program schedule data. since the system always contains data for the current day (today) and the following day(tomorrow), the dynamic area is updated as new data is received.

Figure 22:
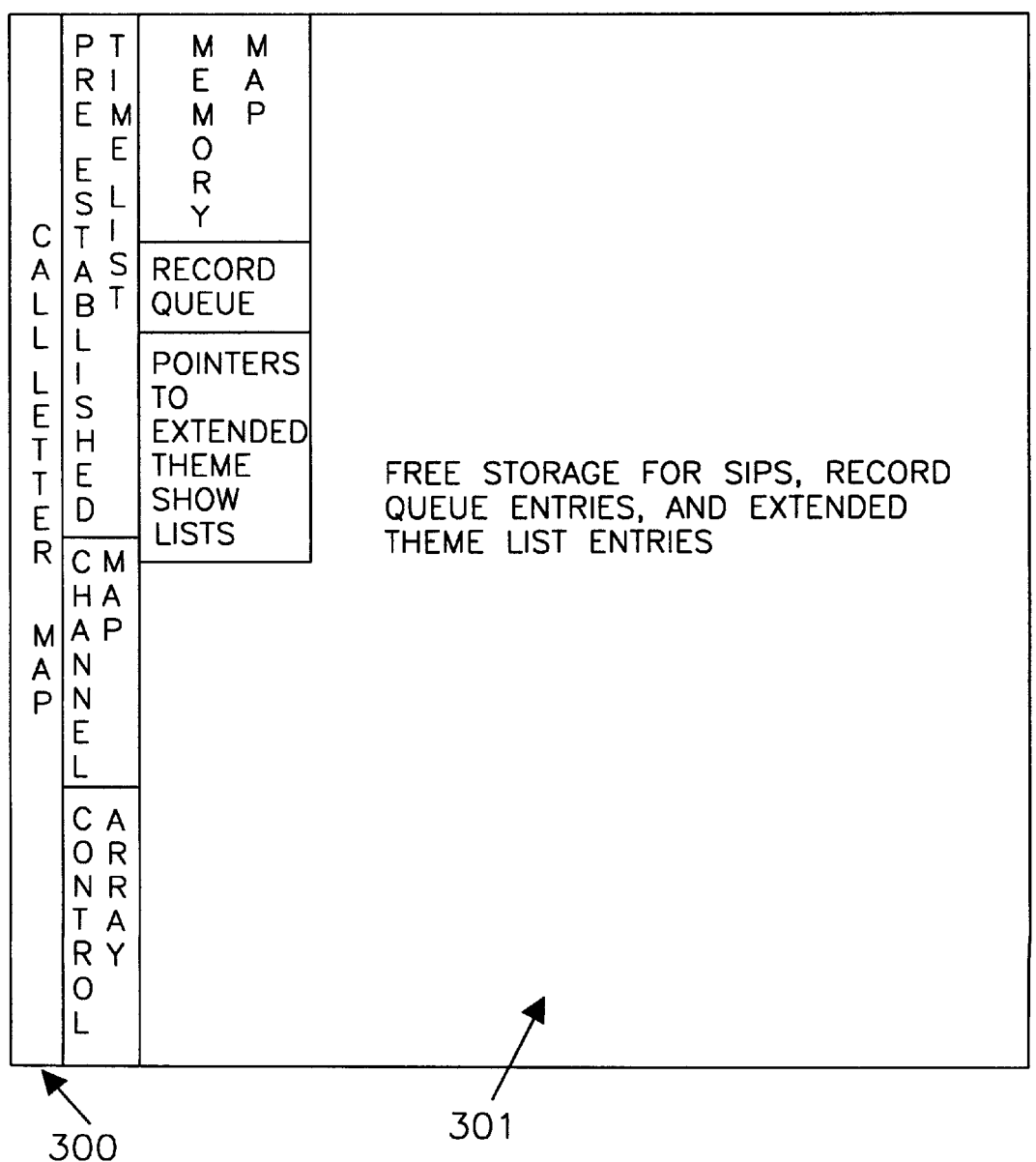
FIG. 22 is a diagram of the RAM memory data base that illustrates the static and dynamic areas of memory.

FIG. 22 depicts the program schedule memory data base. Static area 300 contains the call letter map, the pre-established time list, the channel map, the control array, the memory map, the record queue, and pointers to the extended theme show lists. These structures will be described in greater detail below. Dynamic area 301 is used to store television program schedule data. This data takes the form of show information packages (SIPs) and extended theme show list entries. These structures are also described more fully below.

Data Transmission

Television program data is received in download packets. The download packets are sent over the VBI and received by microprocessor 24 as described with reference to FIG. 20. A download packet contains television program schedule information along with routing data that enables the system to determine how to store the information in memory.

Figure 23:
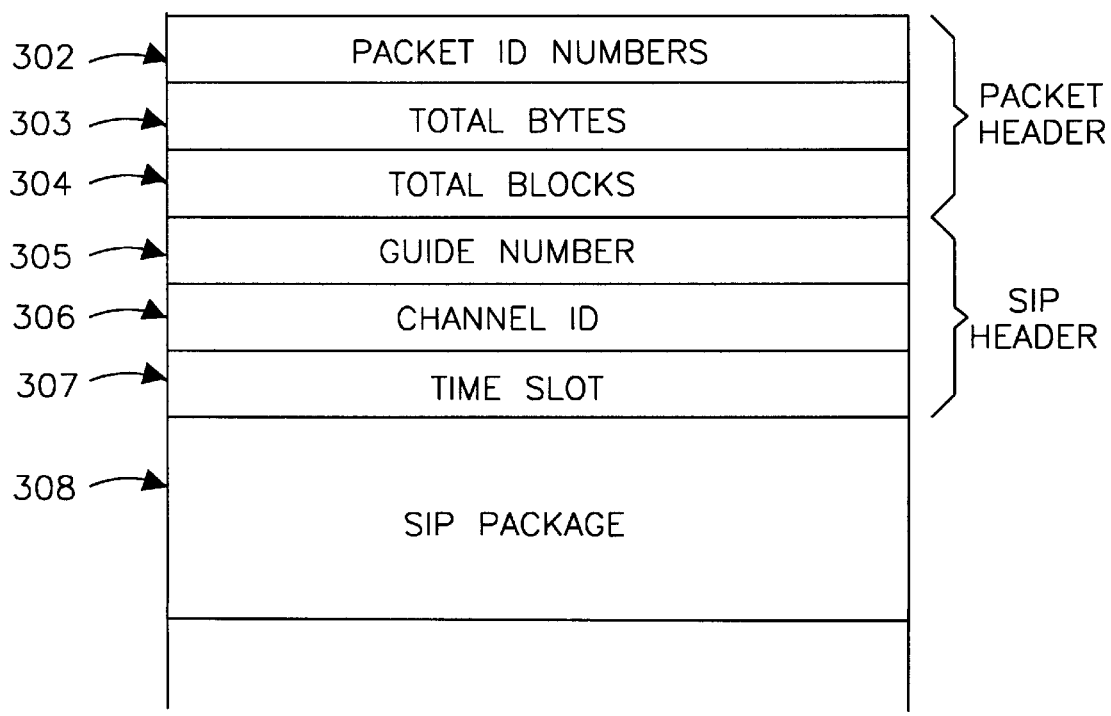
FIG. 23 is a diagram of the download packet received by the system.

FIG. 23 illustrates a download packet. The packet begins with a packet header containing packet ID number 302 used to distinguish this packet from other packets. The packet header also contains number of bytes 303 and number of blocks 304. These values are used to determine the size of the packet.

The packet header is followed by the show information package (SIP) header. There is a show information package header for each show information package in the packet. The SIP header contains: guide number 305 used to determine the internal channel number of the data in the show information package; channel ID 306 used to determine the source of the data in the show information package; and time slot 307 used to designate the time and day of the data in the show information package. A show information package 308 follows the SIP header.

Upon receipt, the system microprocessor extracts a show information package from the download packet and temporarily stores it in program schedule memory. The show information package contains a date field that is used to determine if the data is for the current day(today) or the next day(tomorrow). If the package falls within this two day window the system determines if the data is duplicative of existing data. The show information package contains a version number used to determine if the data is new or if it already exists in memory. If the data is new then it is stored and the address of the show information package is placed in the appropriate pointer in the pre-established time list. The pre-established time list will be explained more fully below.

If the show information package is outside of the current two-day window (today and tomorrow) and the show information package contains programs that have theme information, those programs with theme information are pulled out of the show information package and placed in the appropriate extended theme show list. The extended theme show list is described more fully below. If the show information package is outside of the current two-day window and does not contain theme information, or if the show information package is duplicative of one that is already stored the entire show information package is discarded.

The system uses a memory bit map in order to keep track of which parts of the program schedule memory are currently holding program data and which parts of the program schedule memory are free to store new program data. The memory bit map divides the memory into 32 byte blocks. Each block is represented by a bit in the memory bit map.

The memory bit map is depicted in FIG. 24. Each bit in the map 310 represents a 32 byte block of memory. A "1" in the bit position 311 indicates that program data is stored in that block. A "0" in the position 312 indicates that the block is free. When new data arrives in the system, microprocessor 24 searches through the memory bit map to locate a sufficient number of free positions in which to store data. When the positions are located, microprocessor 24 stores the data and then changes those numbers in the memory bit map from "0" to "1" to indicate that those memory locations are occupied.

For example, referencing FIG. 24, if data is received that requires ten blocks of storage the system will scan the memory map and store the data in the space represented by bits 0–7 in row 3 and bits 0–1 in row 4. These bits will then be set to "1", in the memory bit map.

The system will also periodically re-order the memory so that free space is grouped contiguously. For example, referencing FIG. 24, the data starting in the block represented by bit 2 in row 0 and ending in the block represented by bit 1 in row 1 would be slid over to the block represented by bit 3 in row 0. This will remove the "0" gap in row zero. This process is repeated throughout the memory map so that all free space is grouped together at the end of memory.

The system also contains procedures for reducing the amount of new data that is stored if there is only limited memory space available. By scanning the memory map the system can determine if the memory is becoming full. When this happens the system may discard some new data such as program descriptions in order to maximize the number of individual shows that can be stored in the available memory.

Data Structures

Data in the program schedule memory is stored in data structures that enable the system to interpret the data. Several of the data structures are of fixed length and reside in the static area 300. Other data structures are of variable length and reside in the dynamic area 301. The fixed data structures include: the pre-established time list, the channel map, the control array, the call letter map, the memory map and the record queue. The variable data structures include: show information packages and extended theme show lists.

The pre-established time list is used to locate television program information for each channel in the system. The pre-established time list only references program information that will be broadcast on the current day (today) or on the next day (tomorrow). The pre-established time list references data through the use of pointers which are pieces of data that contain addresses of desired data items.

FIG. 25 illustrates the pre-established time list. The pre-established time list contains a set of twelve pointers 313 for each channel in the system. Each pointer corresponds to a show information package that contains data for a four hour block of television programming. For example, in FIG. 25, the pointer E1 corresponds to program data from four p.m. to eight p.m. Twelve pointers represent 24 hours of programming information for the current day and 24 hours of program information for the next day.

Referring to FIG. 25, pointers A2 through L2 are used to represent the program data associated with the second channel in the system. Each pointer contains an address of a show information package of variable length containing actual television program data. When specific data is needed, the system first looks in the pre-established time list to secure the pointer, then uses the address found in that location to determine where the data is actually stored. For example if data for the second channel in the system is needed for a television program between eight p.m. and twelve midnight the system will use the address in pointer F2 to determine the location of the show information package containing the data.

Show information packages are variable length data structures that contain actual television program schedule data. Each show information package contains data for a four hour block of television programming for a specific channel. The show information package length is variable because the number of shows in each four hour block will depend on the durations of the individual shows.

FIG. 26 depicts a show information package. A show information package contains the following: amount of memory—used to determine how much space was used to store the show information package and therefore, how much space is freed up after the show information package is no longer needed; control date—used to determine whether the data in a specific show information package is for the current day, the next day, or outside of the current two-day window; and version number used to specify the specific version of the program data.

Following these three fields is specific data for each show that fits within the four-hour time block. For a given show, represented by block 314, the following fields are present in the show information package: multiple show flag field—used to determine if this show is the last show within the package, or if there are other shows following to be processed; start time field—an offset from the start time of the four-hour block, this offset is added to the time of the four-hour block to determine the start time of the show; duration field—specifies the air time for the particular show; theme field—contains information on the type of show; for example, the show may be a sporting event, a news program, or a movie; CC field—determines whether or not the show is closed captioned; stereo field—determines whether or not the show is broadcast in stereo; add-ons field—is a field left for expansion, this field will contain more information about the show as that information becomes standard in the art.

Following these fields are fields representing program title, primary description—a short description of the program, secondary description—a longer description of the program and VCR+ PLUSCODE. Each of these items are represented by two fields, one containing the length of a specific item, such as title length, and one containing the item itself, such as title.

Following this information is an end-of-show field. The end-of-show field is used to indicate that the information for that particular show is finished. A show information package may contain information for one or more shows depending on how many shows are broadcast within the four hour block. The presence of multiple shows is represented by 315 and 316.

A show information package is structured so as to provide several unique features for storing data. The title length, primary description length, secondary description length and VCR+ PLUSCODE length fields can be expanded for values that are beyond the maximum value that can be stored within one byte. For example, referring to FIG. 27, if the secondary description length is greater than the maximum value that can be stored within one byte, the length byte is set to the maximum value. The system then assumes that the following byte is also a length byte and adds the two values to determine the length of the secondary description. In this way, a show information package can dynamically allocate space to accommodate longer descriptions or longer titles.

The end-of-show field allows for the inclusion of data in the show information package that is not read by the current version of the system. As shown again in FIG. 27, following the VCR+ PLUSCODE field, there are two fields of unspecified data. This is data which may be read by future versions of the system but is currently not processed by the current system. When processing show information package data the system will discard this data until it reads an end-of-show field. The system will not begin processing data for a new show until an end-of-show field is found. This feature allows the system to access the same data as a potential future version which may incorporate more data.

Television programming information for shows that contain a theme (movie, sporting event, etc.) but have a start time beyond the current two day window (i.e. shows that will air after tomorrow) are stored in an extended theme show list. An extended theme show list is a linked list of television shows. Each show in the list contains data for a single program. The system contains an extended theme show list for each of the different theme categories (sports, movies, children's programming, specials, info).

Figure 28:
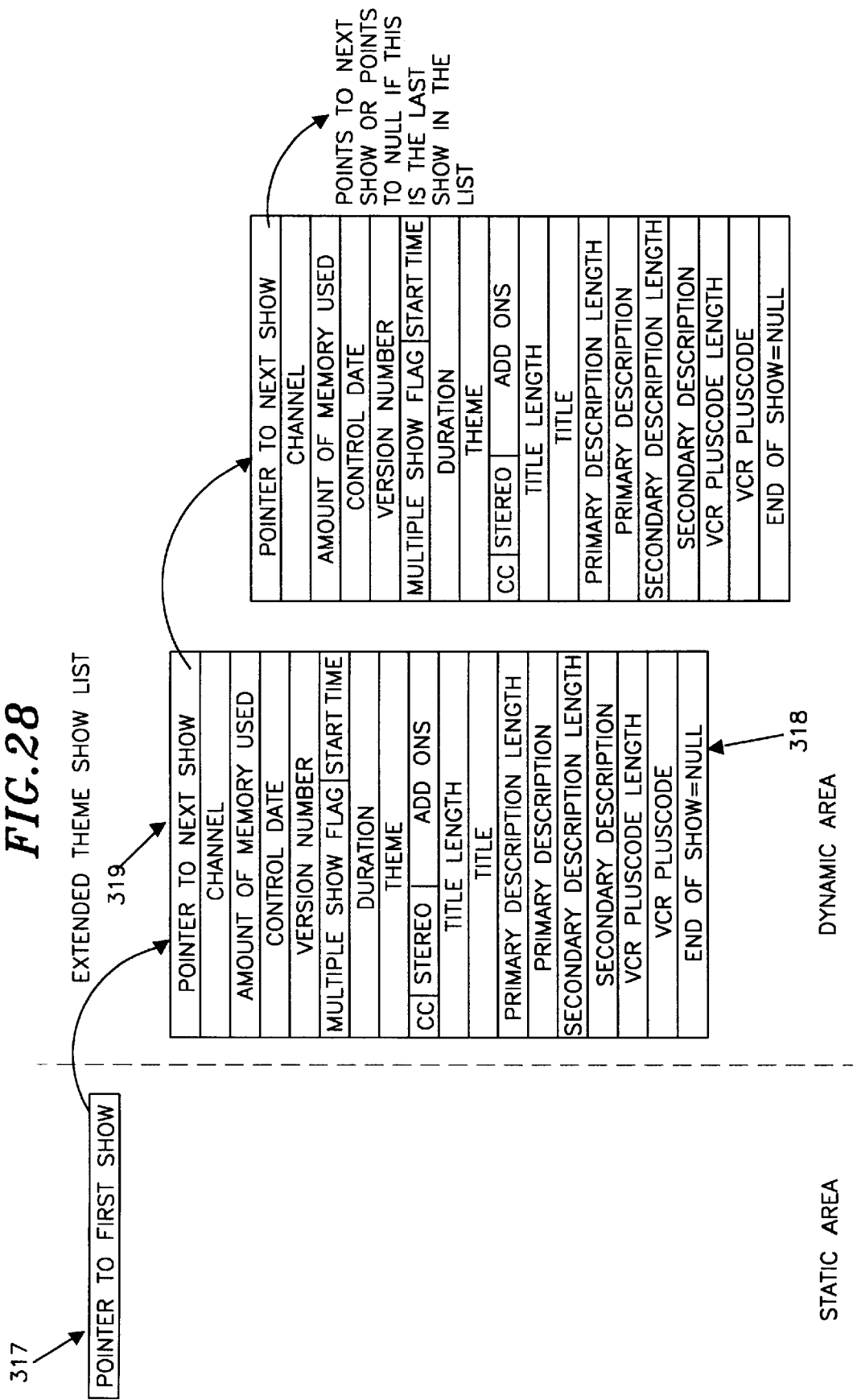
FIG. 28 is an illustration of an extended theme show list.

An extended theme show list is depicted in FIG. 28. The address 317 of the first show in the list 318 is stored in static area 300. Show 318 is stored in dynamic area 301 and contains a pointer 319 to the next show. This scheme is repeated for all shows in the list. The pointer field in the last show contains the value "NULL" to indicate that there are no other shows in the list. Because each show in the list is linked to the next show, an entire list can be traversed by ascertaining the address of the first show in the list.

Each show contains the same field format as show information package 314 with the exception that the channel ID is stored for each show. The conventions applying to show information package 314 that allow for extending the length fields and for additional data before the end-of-show flag also apply in the extended theme show list.

The program schedule memory also contains a channel map located in static memory. The channel map links the source of television program information with the internal guide channel. For example, in FIG. 29, channel 7 is assigned to internal channel 0 and channel 11 is assigned to internal channel 2. The channel map is referenced in order to identify a source channel number when creating a program guide display.

The program schedule memory also contains a preallocated control array located in static memory. The control array is used by the system to track channels which have been inhibited for display by the operator. The control array is depicted in FIG. 30. For each channel, there is a display field 320 which is set to the "1" if the channel is to be displayed and set to the "0" if the channel is to be inhibited. Referring to FIG. 30, channels 0, 1, 3, and 4 will be displayed in a program guide while channel 2 will be inhibited. There is also a field for each channel for additional "add-on" information. This field allows for the addition of other operator controlled functions in future versions of the system such as a parental lock-out facility.

The program schedule memory also contains a call letter map located in static memory. The call letter map links the call letters corresponding to the source channel with the internal guide channel. For example, in FIG. 31, the call letters KABC are linked to internal channel 0 and WWOR is linked to internal channel 1. The call letter map is referenced in order to identify source channel call letters when creating a program guide display.

Operator requests for recording future programs are stored in the record queue. The record queue is a fixed length table (20 entries) located in static area 300. The record queue is depicted in FIG. 32.

Each show in the queue contains a value representing the channel that the show will air on and a value representing the start time of the show. The record queue is structured so that programs are in time sequence order. That is, the first item in the list will be broadcast earlier than any of the other items, and so on. This allows the system to easily find the next program to be recorded.

Data Base Processing

Interaction between the data structures and the system is illustrated through the following examples of system operation. A. The operator, using viewer input device 28 requests a time specific program guide (TISPG), the current time is 7 p.m.

When the user requests a TISPG for information pertaining to television shows that are currently being broadcast, the system first reads the current time (7 p.m.) from the microprocessor clock. The system then determines the pointers that correspond to current time in the pre-established time list, FIG. 25. Since the current time is 7 p.m. the system will look to the fifth pointer (this pointer corresponds to the data from 4 p.m. to 8 p.m.) for each channel: Channel 0-E1, Channel 1-E2, Channel 2-E3, . . . , Channel n-En.

For each pointer the system accesses the associated show information package, FIG. 26. The system adds the start time of the four hour block (4 p.m.) to the time offset in each show in the show information package to determine the show that is currently airing on that channel. Information for the show is then extracted from the show information package. The extracted information includes title, primary description, secondary description and VCR+ PLUSCODE.

Each internal channel number is also used to index into the channel map, FIG. 29. Specifically, the channel number is used to pull out the specific channel ID for display in the guide: Channel 0-7, Channel 1-6, Channel 2-11, . . . , Channel n-172. The channel number is also used to index into the call letter map, FIG. 31. Specifically, the channel number is used to pull out the station identification call letters for display in the guide: Channel 0-KABC, Channel 1-WWOR, . . . , Channel n-KTVR. All of the information from the show information package, the channel map and the call letter map is used to create formatted text lines for display in the guide. B. The operator, using viewer input device 28 requests a channel specific program guide (CSPG), the current channel being viewed is channel 6, the current time is 3 p.m.

When the user requests a CSPG for information pertaining to television shows that are airing or will be broadcast on a specific channel (channel 6) at a specific time (3 p.m.) the system determines the internal channel corresponding to the displayed channel by reading a system variable. For this example the internal channel is channel 1. The system then reads the current time (3 p.m.) from the microprocessor clock. The system determines the pointer that corresponds to current time for the selected internal channel in the pre-established time list, FIG. 25. Since the current time is 3 p.m. and the selected internal channel is channel 1 the system will look to the forth pointer (this pointer corresponds to the data from 12 noon to 4 p.m.) in the second set of pointers. This pointer is D2, FIG. 25.

The system then accesses the associated show information package, FIG. 26, for pointer D2. The system adds the start time of the four hour block (12 noon) to the time offset in each show in the show information package to determine the show that is currently airing. Information for the show is then extracted from the show information package. The extracted information includes title, primary description, secondary description and VCR+ PLUSCODE. The system extracts data for all shows in the show information package pointed to by D2 that occur after the selected show. Information is then extracted for all shows in show information packages pointed to by pointers E2-L2.

The internal channel number is also used to index into the channel map, FIG. 29. Specifically, the channel number is used to pull out the specific channel ID, channel 6, for display in the guide. The channel number is also used to index into the call letter map, FIG. 31. Specifically, the channel number is used to pull out the station identification call letters, WWOR, for display in the guide. All of the information from the show information package, the channel map and the call letter map is used to create formatted text lines for display in the guide. C. The operator, using viewer input device 28 requests a theme specific program guide (THSPG), the selected theme is "MOVIE", the current time is 10:30 a.m.

When the user requests a THSPG for information pertaining to television shows having a specific theme (MOVIE) that are airing or will be broadcast, the system first reads the current time (10:30 a.m.) from the microprocessor clock. The system then determines the pointers that correspond to current time in the pre-established time list, FIG. 25. Since the current time is 10:30 a.m. the system will look to the third pointer (this pointer corresponds to the data from 8 a.m. to 12 noon) for each channel: Channel 0-C1, Channel 1-C2, Channel 2-C3, . . . , Channel n-Cn.

For each pointer the system accesses the associated show information package, FIG. 26. The system adds the start time of the four hour block (8 a.m.) to the time offset in each show in the show information package to determine the show that is currently airing on that channel. Once the show is determined the system compares theme information for that show with the selected theme, "MOVIE". If the show is a movie, information for the show is extracted from the show information package. The extracted information includes title, primary description, secondary description and VCR+ PLUSCODE.

The system then increments the current time by five minutes (10:35) and repeats the above process. The clock is incremented again by five minutes and the process is repeated until the clock time is at the end of the four hour block, i.e. 12 noon. The system then access all remaining pointers, D1-Dn, E1-En, . . . , L1-Ln, and extracts information for all shows that contain the theme "MOVIE".

Once data has been extracted for all shows occurring within the two day window (today and tomorrow) that contain the theme "MOVIE" the system begins extracting data from the "MOVIE" extended theme show list, FIG. 28. The system has the address of the first entry in the "MOVIE" extended theme show list since it is stored in static area 300. Data for all shows in the "MOVIE" extended theme show list is extracted. In the current implementation channel identification numbers for shows in the extended theme show list are extracted from the extended theme show list and not from the static channel map.

In an alternate embodiment of the system, the system user would have the capability to block certain channels. Blocking a channel would inhibit the channel from being displayed on the system, therefore the channel would not be part of the TISPG, CSPG, or THSPG. This feature is implemented through the use of the control array, FIG. 30.

When the user selects a channel for non-display, the display flag in the control array is set to "0". Whenever the system user requests a program guide display, the system first checks the control array before proceeding with processing on the pre-established time list. If the control array for a specific channel is set to "0", no other processing is performed for that channel and the system goes on with the next channel. If the user were to re-select that channel for display in subsequent processing, the system would enact the change the next time a program guide was created.

The control array may also be used to inhibit the storing of data for selected channels. For example, in an alternative embodiment of the system, the system would first check the control array before storing data for a specific channel. If the control array for a specific channel contained a "0" no data corresponding to that channel would be stored. Note that a channel may be inhibited for display as described above without necessarily blocking the storage of data.

In another alternative embodiment the user would have the option of toggling between the TISPG and the CSPG as in FIG. 19. Toggling between these displays would allow the user to create a guide of all program information for a future, user selected, time. The database processing associated with this option is similar to that used for the TISPG and CSPG with the exception that the time used to locate each program is the user specified time in the CSPG in lieu of the current time and the channel would be that specified in the TISPG.

Recording

When the user selects a program for recording the system stores the channel number of the selected program and the program start time in the record queue, FIG. 32. The program start time is computed by adding the offset contained in the show information package to the start time of the associated four hour block of data.

The record queue is put in time order whenever a new entry is added. This ordering facilitates periodic polling of the start time in the first show of the queue to determine the next recording command to be executed. The address of the queue is known to the system as it is in static area 300. When a show is recorded the next show in the queue is moved to the beginning of the queue.

The described embodiments of the invention are only considered to be preferred and illustrative of the invention concept; the scope of the invention is not to be restricted to such embodiment. Various and numerous other arrangements may be devised by one skilled in the art without departing from the spirit and scope of this invention. For example, the disclosed electronic guide features, including the techniques for navigating through the guide, can be used without displaying a real time image of a current television program.

What is claimed is:

1. A method of channel surfing with television apparatus having a tuner and a screen, the method comprising in the order recited the steps of:

storing in a memory a plurality of current and future television program listings representing telecast programs, each program listing including a channel identification;

displaying in a first area of the screen some of the program listings including a current program listing;

marking the current program listing in the first area of the screen;

retrieving from the memory the channel identification of the marked program listing;

using the retrieved channel identification to set the tuner to receive the telecast program represented by the marked program listing;

displaying in a second area of the screen the telecast program received by the tuner;

displaying a future program listing among the program listings in the first area of the screen; and marking the future program listing in the first area of the screen in place of the current program listing without changing the program displayed in the second area.

2. The method of claim 1, additionally comprising replacing the current program listings in the first area of the screen with future program listings for a single channel.

3. The method of claim 1, additionally comprising replacing the current program listings in the first area of the screen with future program listings for a single time.

4. The method of claim 1, additionally comprising replacing the current program listings in the first area of the screen with future program listings for a single theme.

5. The method of claim 1, in which the step of displaying in the second area displays the entire image of the program telecast on the particular channel.

6. The method of claim 1, additionally comprising the step of displaying in a third area of the screen a description of the program represented by the marked program list.

7. The method of claim 6, in which the marking steps mark the program listing with a cursor of a given color and the step of displaying in a third area displays a background of the given color.

8. A method of channel surfing with television apparatus having a tuner and a screen, the method comprising the steps of:
   storing in a memory a plurality of current and future television program listings representing telecast programs;
   setting the tuner to receive the program telecast on a particular channel;
   displaying the received program full screen;
   switching from the full screen display to a program guide mode;
   in the program guide mode simultaneously displaying in a first area of the screen the program telecast on the particular channel, displaying in a second area of the screen some of the program listings stored in the memory including the current program listing corresponding to the program displayed in the first area, marking the program listing corresponding to the program displayed in the first area with a cursor, and displaying in a third area of the screen a description of the program displayed in the first area;
   moving the cursor to mark a future program listing displayed in the second area; and
   switching the display in the third area to a description of the program corresponding to the marked future program listing responsive to the cursor movement without changing the program displayed in the first area.

9. The method of claim 8, in which the storing step stores current program listings including a channel identification and the step of displaying in the second area displays current program listings, the method additionally comprising the steps of:
   retrieving from the memory the channel identification of the marked program listing; and
   using the retrieved channel identification to set the tuner to receive the telecast program represented by the marked program listing; and
   substituting on the screen for the program telecast on the particular channel the telecast program represented by the marked program listing.

10. The method of claim 9, in which the storing step also stores future program listings, the method additionally comprising the step of replacing the current program listings in the second area of the screen with some of the future program listings stored in the memory without changing the program displayed in the first area.

11. The method of claim 8, in which the storing step stores future program listings, the step of displaying in the second area displays future program listings, the step of marking a program listing marks a future program listing, and the step of displaying in a third area of the screen a description of the program represented by the marked program listing displays the description without changing the program displayed in the first area.

12. An entertainment system comprising: a television display having a screen; a television tuner for recovering currently telecast video programs;
   a source of a schedule of program listings including listings for currently telecast video programs, a program description at a first level of detail for each program listing, and a program description at a second level of detail for each program listing;
   means for displaying some of the program listings for currently telecast video programs from the source in a first area of the screen;
   an input device for selectively marking one of the displayed program listings for a currently telecast video program;
   means responsive to the input device for controlling the tuner to display in a second smaller and nonoverlapping area of the screen simultaneously with the program listings the currently telecast video program corresponding to the marked program listing, such that the entire image of the video program is visible in real time;
   means for displaying in a third area of the screen the program description at the first level of detail corresponding to the marked program listing; and
   means responsive to the input device for substituting the program description at the second level of detail corresponding to the marked program listing for the program listings displayed in the first area.

13. A method of channel surfing with television apparatus having a tuner and a screen, the method comprising the steps of:
   storing in a memory a plurality of current television program listings representing telecast programs, each program listing including a channel identification;
   setting the tuner to receive a current program telecast on a particular channel;
   displaying in a first area of the screen at least some of the current program listings stored in the memory;
   simultaneously displaying in a second area of the screen in real time a current television program;
   successively marking on the screen current program listings displayed in the first area;
   successively retrieving from the memory channel identifications of the marked program listings;
   using the retrieved channel identifications to set the tuner successively to receive the current telecast programs represented by the marked program listings and successively to display such programs in the second area of the screen as program listings are marked in the first area; and
   responsive to a user command, maintaining the current telecast program displayed in the second area as program listings are successively marked in the first area.

14. The method of claim 13, additionally comprising the step of displaying a first prompt in a third area of the screen; the maintaining step comprising the step of activating the first prompt responsive to the user command.

15. The method of claim 14, additionally comprising the step of displaying a second prompt in the third area of the screen; the setting and displaying steps comprising the step of activating the second prompt responsive to a user command after activating the first prompt.

16. The method of claim 13, additionally comprising the step of displaying a prompt in the third area of the screen; the setting and displaying steps comprising the step of activating the prompt responsive to a user command.

17. The method of claim 16, in which the stored program listings include themes, the method additionally comprising the step of selecting a theme and the step of displaying program listings in a first area of the screen displays program listings that meet the selected theme.

18. The method of claim 16, additionally comprising the step of displaying in a third area of the screen description of the program marked in the first area.

19. The method of claim 18, additionally comprising the steps of also storing a plurality of future television program listings in the memory, displaying one or more of the future program listings in the first area, marking one of the displayed future program listings, and changing the description in the third area to a description of the program corresponding to the marked future program listing without changing the television program displayed in the second area.

20. An entertainment system comprising:

a television display having a screen;

a source of a schedule of television program listings, a program description at a first level of detail for each program listing, and a program description at a second level of detail for each program listing;

means for displaying some of the program listings for from the source in a first area of the screen;

an input device for selectively marking one of the displayed program listings;

means for displaying in a second area of the screen the program description at the first level of detail corresponding to the marked program listing; and means responsive to the input device for substituting the program description at the second level of detail corresponding to the marked program listing for the program listings displayed in the first area.

21. The method of claim 1, additionally comprising the step of displaying in a third area of the screen a description of the current or future program corresponding to the marked program listings.

* * * * *

UNITED STATES PATENT AND TRADEMARK OFFICE
CERTIFICATE OF CORRECTION

PATENT NO.    : 6,239,794 B1
DATED         : May 29, 2001
INVENTOR(S)   : Henry C. Yuen et al.

It is certified that error appears in the above-identified patent and that said Letters Patent is hereby corrected as shown below:

Title page,
Item [56], References Cited, FOREIGN PATENT DOCUMENTS, replace "444496 9/1996 (EP)". with -- 444496 9/1991 (EP) --.
Item [57], ABSTRACT,
Line 3, change "data base" to -- database --.

Drawings,
Sheet 2, FIG. 2 replace "ABS 7 EYEWITNESS NEWS AT 6" with -- ABC 7 EYEWITNESS NEWS AT 6 --.

Column 22,
Lines 42 and 43, replace "in the order recited the steps of" with -- the order recited in the steps of --.

Column 23,
Line 12, replace "program list" with -- program listing --.

Column 25,
Lines 10 and 15, replace "the method of claim 16" with -- the method of claim 13 --.

Column 26,
Line 8, after "program listings" delete "for".

Signed and Sealed this

Second Day of December, 2003

JAMES E. ROGAN
*Director of the United States Patent and Trademark Office*